US009515920B2

(12) United States Patent
Zhang et al.

(10) Patent No.: US 9,515,920 B2
(45) Date of Patent: Dec. 6, 2016

(54) NAME-BASED NEIGHBOR DISCOVERY AND MULTI-HOP SERVICE DISCOVERY IN INFORMATION-CENTRIC NETWORKS

(71) Applicant: Futurewei Technologies, Inc., Plano, TX (US)

(72) Inventors: Xinwen Zhang, San Jose, CA (US); Bin Zhao, West Lafayette, IN (US); Asit Chakraborti, Pleasanton, CA (US); Ravishankar Ravindran, San Jose, CA (US); Guo-Qiang Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 689 days.

(21) Appl. No.: 13/658,299

(22) Filed: Oct. 23, 2012

(65) Prior Publication Data
US 2013/0282860 A1 Oct. 24, 2013

Related U.S. Application Data

(60) Provisional application No. 61/636,430, filed on Apr. 20, 2012.

(51) Int. Cl.
*H04L 12/725* (2013.01)
*H04L 29/08* (2006.01)
*H04L 12/751* (2013.01)

(52) U.S. Cl.
CPC ........... *H04L 45/306* (2013.01); *H04L 67/025* (2013.01); *H04L 67/16* (2013.01); *H04L 67/306* (2013.01); *H04L 45/02* (2013.01); *H04L 45/308* (2013.01)

(58) Field of Classification Search
CPC ........ H04L 45/306; H04L 45/08; H04L 45/02; H04L 45/308; H04L 45/54; H04L 67/025; H04L 67/2833; H04L 67/2842
(Continued)

(56) References Cited

U.S. PATENT DOCUMENTS

2003/0095504 A1\* 5/2003 Ogier ............................ 370/235
2004/0054807 A1\* 3/2004 Harvey et al. ................ 709/243
(Continued)

FOREIGN PATENT DOCUMENTS

CN 101820386 A 9/2010
CN 102045252 A 5/2011
(Continued)

OTHER PUBLICATIONS

Bengt, "A Survey of Information-Centric Networking", Feb. 2, 2011.\*
(Continued)

*Primary Examiner* — Kevin Bates
*Assistant Examiner* — Mark A Scott
(74) *Attorney, Agent, or Firm* — Conley Rose, P.C.

(57) ABSTRACT

A content router, comprising a plurality of physical links to other nodes in an information centric network, a receiver coupled to the plurality of physical links configured to receive messages, a transmitter coupled to the plurality of physical links configured to transmit messages, and a service publishing and discovery (SPD) module comprising a processor and memory device coupled to the receiver and to the transmitter, wherein the SPD is configured to store status updates of the physical links, wherein the SPD is configured to determine a next hop and a number of hops to forward a received message based on a prefix in a name-based service discovery protocol name of a received message.

18 Claims, 16 Drawing Sheets

(58) Field of Classification Search
USPC .................................................. 709/217, 206
See application file for complete search history.

(56) References Cited

U.S. PATENT DOCUMENTS

| | | | | |
|---|---|---|---|---|
| 2004/0103282 | A1* | 5/2004 | Meier et al. ................. | 713/171 |
| 2005/0152286 | A1* | 7/2005 | Betts et al. .................. | 370/255 |
| 2005/0198301 | A1* | 9/2005 | Ould-Brahim ............... | 709/227 |
| 2006/0109815 | A1* | 5/2006 | Ozer et al. ................... | 370/329 |
| 2006/0187858 | A1* | 8/2006 | Kenichi et al. .............. | 370/254 |
| 2007/0078986 | A1* | 4/2007 | Ethier et al. ................. | 709/227 |
| 2007/0189249 | A1* | 8/2007 | Gurevich et al. ............ | 370/338 |
| 2007/0248065 | A1* | 10/2007 | Banerjea et al. ............ | 370/338 |
| 2008/0316997 | A1* | 12/2008 | Zeng et al. .................. | 370/351 |
| 2009/0019056 | A1* | 1/2009 | Othman et al. ............... | 707/10 |
| 2009/0034419 | A1* | 2/2009 | Flammer et al. ............ | 370/328 |
| 2009/0046732 | A1* | 2/2009 | Pratt et al. .................... | 370/406 |
| 2009/0138617 | A1* | 5/2009 | Veillette ....................... | 709/238 |
| 2009/0225761 | A1* | 9/2009 | Sarikaya et al. ............. | 370/400 |
| 2009/0285213 | A1* | 11/2009 | Chen et al. ................... | 370/392 |
| 2009/0288163 | A1* | 11/2009 | Jacobson et al. .............. | 726/22 |
| 2010/0014444 | A1* | 1/2010 | Ghanadan et al. ........... | 370/310 |
| 2010/0061272 | A1* | 3/2010 | Veillette ....................... | 370/254 |
| 2010/0128731 | A1* | 5/2010 | Alfano et al. ............. | 370/395.7 |
| 2010/0195653 | A1* | 8/2010 | Jacobson ................ | H04L 45/00 370/392 |
| 2010/0195655 | A1 | 8/2010 | Jacobson et al. | |
| 2010/0254312 | A1* | 10/2010 | Kennedy ...................... | 370/328 |
| 2010/0265846 | A1* | 10/2010 | Weniger ........................ | 370/254 |
| 2011/0013557 | A1* | 1/2011 | Westberg et al. ............ | 370/328 |
| 2011/0090908 | A1 | 4/2011 | Jacobson et al. | |
| 2011/0153865 | A1 | 6/2011 | Hong et al. | |
| 2011/0161355 | A1* | 6/2011 | Lee ......................... | H04L 45/00 707/769 |
| 2011/0238793 | A1* | 9/2011 | Bedare et al. ................ | 709/227 |
| 2011/0271007 | A1* | 11/2011 | Wang et al. .................. | 709/238 |
| 2011/0280214 | A1* | 11/2011 | Lee ...................... | H04W 36/023 370/331 |
| 2012/0136945 | A1* | 5/2012 | Lee ..................... | H04L 67/2838 709/206 |
| 2012/0317613 | A1* | 12/2012 | Kim ....................... | H04L 63/10 726/1 |
| 2013/0028140 | A1* | 1/2013 | Hui et al. ..................... | 370/255 |
| 2013/0029664 | A1* | 1/2013 | Lee ......................... | H04L 67/32 455/435.1 |
| 2013/0041982 | A1* | 2/2013 | Shi et al. ...................... | 709/217 |
| 2013/0051399 | A1* | 2/2013 | Zhang et al. ................. | 370/401 |
| 2013/0060940 | A1* | 3/2013 | Koponen et al. ............ | 709/225 |
| 2013/0083701 | A1* | 4/2013 | Tomic et al. ................. | 370/255 |
| 2013/0094536 | A1* | 4/2013 | Hui et al. ...................... | 375/133 |
| 2013/0166703 | A1* | 6/2013 | Hammer et al. ............. | 709/220 |
| 2013/0188521 | A1* | 7/2013 | Jain .............................. | 370/255 |
| 2013/0188651 | A1* | 7/2013 | Bosch et al. ................. | 370/401 |
| 2013/0198351 | A1* | 8/2013 | Widjaja .............. | H04L 67/2842 709/223 |
| 2013/0223447 | A1* | 8/2013 | Kahng et al. ................. | 370/392 |
| 2013/0242996 | A1* | 9/2013 | Varvello et al. ............. | 370/392 |
| 2013/0275618 | A1* | 10/2013 | Puttaswamy Naga ..................... | H04L 67/2842 709/236 |
| 2013/0315102 | A1* | 11/2013 | Kahng et al. ................. | 370/254 |
| 2013/0339481 | A1* | 12/2013 | Hong ..................... | H04L 67/16 709/217 |
| 2014/0006565 | A1* | 1/2014 | Muscariello et al. ........ | 709/219 |
| 2015/0281376 | A1* | 10/2015 | Mahadevan ........ | H04L 41/0809 709/223 |

FOREIGN PATENT DOCUMENTS

| | | |
|---|---|---|
| CN | 102271148 A | 12/2011 |
| JP | 2009272802 A | 11/2009 |
| JP | 2010178343 A | 8/2010 |
| JP | 2011244445 A | 12/2011 |

OTHER PUBLICATIONS

Diego, "A Reality Check for Content Centric Networking", Aug. 19, 2011.*

Zviad, "CPHASH: A Cache-Partitioned Hash Table", Feb. 25-29, 2012.*

Kirsch, "Hash-Based Techniques for High-Speed Packet Processing", Jan. 20, 2010.*

Networking Named Content; Van Jacobson; CoNEXT'09, Dec. 1-4, 2009, Rome, Italy.*

Content Discovery in Opportunistic Content-Centric Networks; Carlos Anastasiades;.*

Realizing Name-based Routing in the Network Layer; Haesung Hwang; Jan. 2012.*

Named DataNetworking (NDN) Project; Lixia Zhang; Oct. 30, 2010.*

Foreign Communication From a Counterpart Application, European Application No. 13777738.9, Extended European Search Report dated Oct. 14, 2014, 8 pages.

Parc, a Xerox Company, "Content-Centric Networking—Next-Gen Network Architecture to Solve Challenges in Content Distribution Scalability, Mobility, and Security," http://www.parc.com/work/focus-area/content-centric-networking/, downloaded from the Internet Oct. 18, 2012, 3 pages.

Named Data Networking, "Named Data Networking (NDN) Project Overview," http://www.named-data.net/, downloaded from the Internet Oct. 18, 2012, 2 pages.

Zero Configuration Networking (Zeroconf), http//www.zeroconf.org/, downloaded from the Internet Oct. 18, 2012, 5 pages.

Shanbhag, S. et al., "SoCCer: Services over Content-Centric Routing," ICN 2011, ACM SIGCOMM 2011 Workshop, Toronto, Ontario, Canada, Aug. 19, 2011, pp. 62-67.

"CCNx Protocol," http://www.ccnx.org/releases/latest/doc/technical/CCNxProtocol.html, downloaded from the Internet Oct. 18, 2012, 7 pages.

"CCNx Basic Name Conventions," http://www.ccnx.org/releases/latest/doc/technical/NameConventions.html, downloaded from the Internet Oct. 18, 2012, 6 pages.

"CCNx Name," http://www.ccnx.org/releases/latest/doc/technical/Name.html, downloaded from the Internet Oct. 18 2012, 1 page.

"CCNx URI Scheme," http://www.ccnx.org/releases/latest/doc/technical/URI.html, downloaded from the Internet Oct. 18, 2012, 1 page.

"CCNx Content Object," http://www.ccnx.org/releases/latest/doc/technical/ContentObject.html, downloaded from the Internet Oct. 18, 2012, 3 pages.

"CCNx Algorithm Use," http://www.ccnx.org/releases/latest/doc/technical/CryptographicAlgorithms.html, downloaded from the Internet Oct. 18, 2012, 2 pages.

"CCNx Interest Message," http://www.ccnx.org/releases/latest/doc/technical/InterestMessage.html, downloaded from the Internet Oct. 18, 2012, 6 pages.

"Canonical CCNx Ordering," http://www.ccnx.org/releases/latest/doc/technical/CanonicalOrder.html, downloaded from the Internet Oct. 18, 2012, 1 page.

"CCNx Binary Encoding (ccnb)," http://www.ccnx.org/releases/latest/doc/technical/BinaryEncoding.html, downloaded from the Internet Oct. 18, 2012, 3 pages.

"CCNx Timestamp Format," http://www.ccnx.org/releases/latest/doc/technical/Timestamp.html, downloaded from the Internet Oct. 18, 2012, 1 page.

"Implicit Digest Component," http://www.ccnx.org/releases/latest/doc/technical/DigestComponent.html, downloaded from the Internet Oct. 18, 2012, 1 page.

"CCNx Face Management and Registration Protocol," http://www.ccnx.org/releases/latest/doc/technical/Registration.html, downloaded from the Internet Oct. 18, 2012, 5 pages.

"CCNx StatusResponse," http://www.ccnx.org/releases/latest/doc/technical/StatusResponse.html, downloaded from the Internet Oct. 18, 2012, 1 page.

"CCNx Signature Generation and Verification," http://www.ccnx.org/releases/latest/doc/technical/SignatureGeneration.html, downloaded from the Internet Oct. 18, 2012, 6 pages.

(56) References Cited

OTHER PUBLICATIONS

"Staleness Handling in CCNx," http://www.ccnx.org/releases/latest/doc/technical/Staleness.html, downloaded from the Internet Oct. 18, 2012, 1 page.
"Name Enumeration Protocol," http://www.ccnx.org/releases/latest/doc/technical/NameEnumerationProtocol.html, downloaded from the Internet Oct. 18, 2012, 2 pages.
"CCNx Repository Policy Handling," http://www.ccnx.org/releases/latest/doc/technical/RepoPolicies.html, downloaded from the Internet Oct. 18, 2012, 2 pages.
"CCNx Respository Protocols," http://www.ccnx.org/releases/latest/doc/technical/RepoProtocol.html, downloaded from the Internet Oct. 18, 2012, 7 pages.
"CCNx RepositoryInfo Object," http://www.ccnx.org/releases/latest/doc/technical/RepositoryInfoObject.html, downloaded from the Internet Oct. 18, 2012, 2 pages.
"CCNx Synchronization Protocol," http://www.ccnx.org/releases/latest/doc/technical/SynchronizationProtocol.html, downloaded from the Internet Oct. 18, 2012, 7 pages.
"CCNx Create Collection Protocol," http://www.ccnx.org/releases/latest/doc/technical/CreateCollectionProtocol.html, downloaded from the Internet Oct. 18, 2012, 4 pages.
"CCNx Link Messages," http://www.ccnx.org/releases/latest/doc/technical/LinkMessages.html, downloaded from the Internet Oct. 18, 2012, 1 page.
"CCNx DTD," http://www.ccnx.org/releases/latest/doc/technical/dtd.html, downloaded from the Internet Oct. 18, 2012, 3 pages.
"CCNx Main Schema," http://www.ccnx.org/releases/latest/doc/technical/xsd.html, downloaded from the Internet Oct. 18, 2012, 6 pages.
"CCNx Repository DTD," http://www.ccnx.org/releases/latest/doc/technical/repository.dtd.html, downloaded from the Internet Oct. 18, 2012, 1 page.
"CCNx Repository Schema," http://www.ccnx.org/releases/latest/doc/technical/repository.xsd.html, downloaded from the Internet Oct. 18, 2012, 2 pages.
"CCNx Sync DTD," http://www.ccnx.org/releases/latest/doc/technical/sync.html, downloaded from the Internet Oct. 18, 2012, 1 page.
"CCNx Sync Schema," http://www.ccnx.org/releases/latest/doc/technical/sync.xsd.html, downloaded from the Internet Oct. 18, 2012, 2 pages.
"CCNx DTAG Values," http://www.ccnx.org/releases/latest/doc/technical/DTAG.html, downloaded from the Internet Oct. 18, 2012, 5 pages.
Ravindran, et al. "Information-centric Networking based Homenet," Integrated Network Management, IFIP/IEEE IM2013 Workshop: 5th International Workshop on Management of the Future Internet (ManFI), May 27-31, 2013, pp. 1102-1108.
Partial English Translation and Abstract of Japanese Patent Application No. JPA2009-272802, Nov. 19, 2009, 26 pages.
Partial English Translation and Abstract of Japanese Patent Application No. JPA2010-178343, Aug. 12, 2010, 39 pages.
Partial English Translation and Abstract of Japanese Patent Application No. JPA2011-244445, Dec. 1, 2011, 48 pages.
Foreign Communication From a Counterpart Application, Japanese Application No. 2015-506087, Japanese Office Action dated Dec. 1, 2015, 3 pages.
Foreign Communication From a Counterpart Application, Japanese Application No. 2015-506087, English Translation of Japanese Office Action dated Dec. 1, 2015, 4 pages.
Foreign Communication From a Counterpart Application, Chinese Application No. 201380020918.6, Chinese Search Report dated Aug. 22, 2016, 2 pages.
Foreign Communication From a Counterpart Application, Chinese Application No. 201380020918.6, Chinese Office Action dated Aug. 31, 2016, 4 pages.

* cited by examiner

NAME-BASED NEIGHBOR DISCOVERY AND MULTI-HOP SERVICE DISCOVERY IN INFORMATION-CENTRIC NETWORKS

CROSS-REFERENCE TO RELATED APPLICATIONS

The present application claims the benefit of U.S. Provisional Patent Application No. 61/636,430 filed Apr. 20, 2012 by Xinwen Zhang et al. and entitled "A Method for Name-Based Neighbor Discovery and Multi-Hop Service Discovery in Content-Oriented Network Architecture," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In an Information-Centric Network (ICN) such as a Content-Centric Network (CCN) or a Named Data Network (NDN), (collectively referred to herein as ICNs), a content router is responsible for routing user requests and content to proper recipients. In an ICN, a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network. In ICNs, content delivery including publishing, requesting, managing (e.g., modification, deletion, etc.) may be based on content name and not content location. One aspect of ICNs that may be different from traditional Internet Protocol (IP) networks is the ability of ICNs to interconnect multiple geographical points and cache content temporarily or store content on a more persistent basis. This may allow content to be served from the network instead of an original server, and thus may substantially improve user experience. The caching/storing may be used for real time data that is fetched by the user or for persistent data that belongs to the user or to a content provider, e.g., a third party provider.

Consider the problem of service discovery in an ICN. It may be desirable to have a name-based service discovery solution, other than an address-based service discovery built on IP as described in Zero Configuration Networking (Zeroconf) a copy of which may be found at www.zeroconf.org and which is incorporated herein by reference as if reproduced in its entirety. An Exclusion Filter (EF) mechanism has been proposed for this purpose and implemented in CCNx, where discovered service names are included in an exclusion filter of repeated discovery interest messages with the same name prefix, and returned data messages with the service name in this filter will be excluded, so at most a new service name will be discovered in each round if it exists. (More information regarding the EF mechanism may be found at conferences.sigcomm.org/sigcomm/2011/papers/icn/p68.pdf which is incorporated herein by reference as if reproduced in its entirety.) However, this EF mechanism may not be efficient since a single discovery session needs multiple rounds of interest-data message exchanges depending on the number of service names to be excluded, and it may be difficult for an end user to decide when the discovery protocol should be ended due to the unknown number of service names to be discovered.

SUMMARY

In one embodiment, the disclosure includes a content router, comprising a plurality of physical links to other nodes in an information centric network, a receiver coupled to the plurality of physical links configured to receive messages, a transmitter coupled to the plurality of physical links configured to transmit messages, and a service publishing and discovery (SPD) module comprising a processor and memory device coupled to the receiver and to the transmitter, wherein the SPD is configured to store status updates of the physical links, wherein the SPD is configured to determine a next hop and a number of hops to forward a received message based on a prefix in a name-based service discovery protocol name of a received message.

In another embodiment, the disclosure includes a network node, comprising a plurality of interfaces configured to receive and transmit an interest message and a data message to and from a plurality of remote nodes in an information centric network, a link manager (LM) comprising a processor coupled to the interfaces, wherein the LM is configured to monitor the interfaces, and a local service publishing and discovery (SPD) module comprising a processor and coupled to the interfaces and to the LM, wherein the local SPD module is configured to aggregate service profiles published by services on a local node with service profiles collected from remote SPDs in the remote nodes, wherein local services publish only to the local SPD, wherein the local SPD is configured to discover an available service on a reachable one of the remote nodes within a specified hop away from the local node, and wherein the SPD module is configured to configure and register the remote nodes with corresponding interfaces based on a prefix in a name-based service discovery protocol name of the service profiles, wherein the LM is configured to notify the local SPD when a new link to one of the remote nodes is detected at one of the interfaces.

In a third aspect, the disclosure includes a method for discovering services in an information centric network, comprising receiving service profiles of local services, formulating with a processor an interest message to a remote node wherein the interest message comprises a request for service profiles and a hop number, wherein the hop number indicates a number of hops to forward the interest message, receiving a data message from the remote node, wherein the data message comprises aggregated service profiles for services provided by the remote node and from other remote nodes coupled to the remote node within the hop number of the local node, and aggregating with a processor the service profiles of the local services and the aggregated service profiles received from the remote node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a name-based neighbor and service discovery scheme for ICN, comprising two fundamental protocols, e.g., name-based neighbor discovery protocol and name-based service discovery protocol. Applying these name-based neighbor discovery protocol and name-based service discovery protocol on an Information-Centric Network (ICN), such as, for example, a Content-Centric Network (CCN) does not require any change in the transportation model. Disclosed is an ICN node architecture incorporated with a Service Publishing and Discovery (SPD) module. In an embodiment, a name-based neighbor discovery protocol is provided to resolve the establishment and maintenance of neighbor relations. This protocol may be initialized when an ICN node boots up and may keep running independently on a SPD. In an embodiment, a name-based service discovery protocol to discover all available services (profiles) known by reachable nodes within a multiple-hop away from an origin node in a single service discovery session is provided. A name-based service discovery protocol may be running after some necessary Forwarding Information Based (FIB) entries have been set up for service discovery interest messages by the name-based neighbor discovery protocol. This name-based discovery protocol may be capable of finding the first available path from an origin node to any available services on remote nodes by tracing the interfaces (also referred to herein as faces) of intermediate nodes, from which a collected and aggregated service profile may be delivered. In an embodiment, an application may decide to request a service based on its service profile. The disclosed methods, systems, apparatuses, and figures are disclosed herein primarily with reference to CCN. However, those of ordinary skill in the art will recognize that the same or similar methods, systems, and apparatuses may apply to any ICN architecture.

Figure 1:
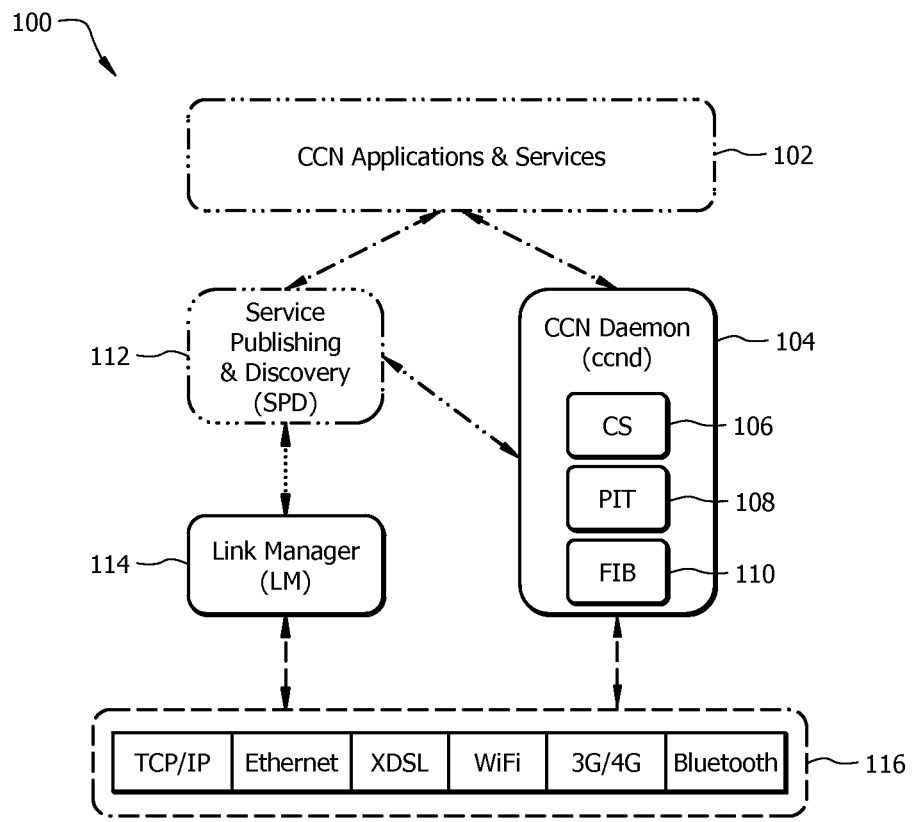
FIG. 1 is a block diagram illustrating an augmented CCN node architecture for discovery in accordance with an embodiment.

FIG. 1 is a block diagram illustrating an augmented CCN node architecture 100 for discovery in accordance with an embodiment. The CCN node architecture 100 may comprise a Service Publishing and Discovery (SPD) component 112, a Link Manager (LM) 114, a CCN Applications and Services Component 102, a CCN Daemon (ccnd) 104, and physical links 116. The physical links may include Transmission Control Protocol/Internet Protocol (TCP/IP) based links, Ethernet links, Extended Digital Subscriber Line (XDSL) links, WiFi links, 3G and 4G wireless links, and Bluetooth links. The ccnd 104 may comprise a Content Store (CS) 106, a Pending Interest Table (PIT) 108, and a Forwarding Information Base (FIB) 110. The CS 106 may store content and, when an interest packet is received, the CS 106 may be checked to determine if the requested content is stored in the CS 106. If the requested content is stored in CS 106, the content may be retrieved from the CS 106 and provided to the requester. Content retrieved from other locations within a network may also be stored in the CS 106. The PIT 108 may store pending requests for content and an indication of the interfaces for which the associated content has been requested. When a data packet is received, the PIT 108 may be checked for pending requests. If a pending request is found, the data packet may be stored in CS 106 and forwarded to the interfaces listed in the PIT. If no PIT entry is found, the data packet may be discarded. The FIB 110 may comprise a table or other data structure that associates prefixes of content names to one or multiple next hop routers. The ccnd 104 may run as the network stack with routing, forwarding and caching functions as usual. The SPD module 112 may run locally in the application level. The SPD module 112 may comprise a processor and/or a memory (or storage) component. The SPD module 112 may comprise information about neighboring content routers and the services available at the neighboring content routers. The LM 114 may comprise a processor. In an embodiment, the SPD module 112 and the LM 114 may share a processor. The LM 114 may monitor the connectivity of all physical links 116 and notify the SPD module 112 of the status updates of all physical links 116.

In the disclosed name-based neighbor discovery protocol, a neighbor is defined by direct connectivity to a target node and constrained within 1-hop scope. In an embodiment, it may be assumed that an available LM 114 will monitor the connectivity of all physical links 116 and notify the SPD 112 module of the status updates of all physical links 116. Establishment and maintenance of neighbor relations are some of the issues that may be resolved by the disclosed name-based neighbor discovery protocol based on the node architecture 100 in FIG. 1. The name-based neighbor discovery protocol may be initialized when the node 100 boots up and may keep running independently on the SPD 112. The disclosed name-based neighbor discovery protocol may be capable of being triggered by the LM 114 as soon as any link status has been updated.

Figure 2:
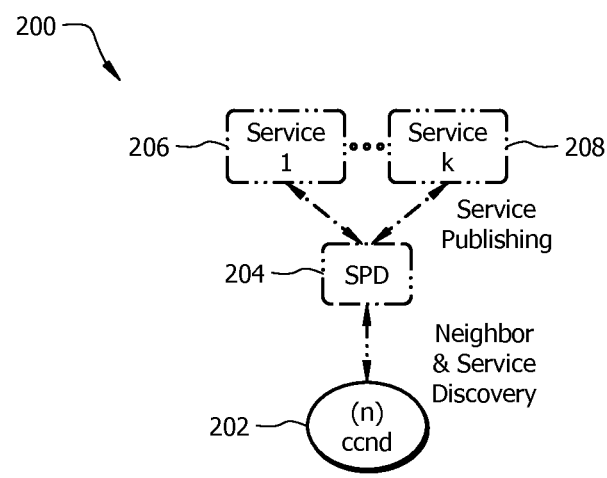
FIG. 2 is a block diagram illustrating the comprehensive functions of a SPD module in accordance with an embodiment.
Figure 3:
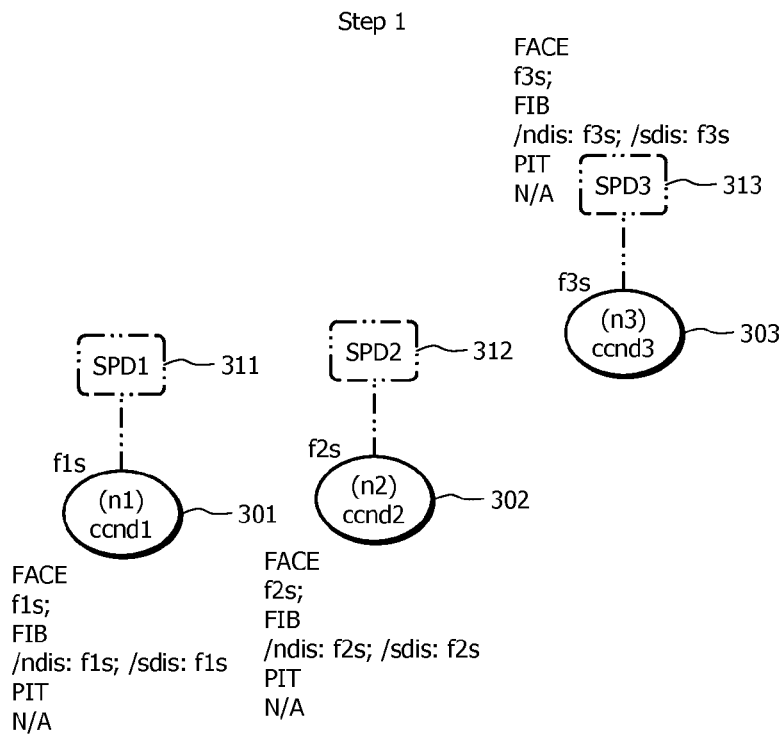
FIGS. 3-9 are block diagrams illustrating an exemplary method for establishment of neighbor relations in accordance with a disclosed embodiment.

FIG. 2 is a block diagram of a system 200 illustrating the functions of a SPD module 204 in accordance with an embodiment. SPD module 204 may be implemented as SPD module 112 depicted in FIG. 1. A LM (not shown) available on local node 202 may monitor the connectivity of all physical links and notify the SPD module 204 of the status updates of all physical links, such as, for example, the physical links 116 depicted in FIG. 1. In contrast to conventional schemes where each service may publish its service profile to the network directly, in the disclosed service publishing mechanism, each service profile 206, 208 may publish its service(s) to the local SPD module 204. The SPD module 204 may manage the published services on the local node 202, aggregate the services profiles 206, 208 that published on the local node 202 and the service profiles collected from remote nodes (not shown), and respond to a service discovery interest message with a data message that may comprise the collected and aggregated services profiles.

The disclosed name-based service discovery scheme may not require any change on CCN transportation model, and an end user may only need to use a single discovery interest message in a discovery session. The disclosed name-based service discovery scheme may comprise two fundamental protocols, e.g. a name-based neighbor discovery protocol and a name-based service discovery protocol.

Some of the notations that may be used herein to describe various components, services, messages, and protocols are shown in Table 1.

TABLE 1

| Notations | |
|---|---|
| ccndx | CCN daemon on node x |
| CS | Content Store |
| Dx | Data messages from node x |
| dp | Data payload field of data messages |
| FACE | Face list of CCN daemon |
| FIB | Forwarding Information Base |
| fxa | Face of an application on node x |
| fxs | Face of a SPD on node x |
| fxy | Face of a connected link indexed by y on node x |
| h | Hop number field of service discovery interest messages |
| Ix | Interest messages to node x |
| N/A | Not Available |
| nm | Name prefix field of interest/data messages |
| nx | Name prefix of node x |
| PIT | Pending Interest Table |
| rxy | Random sequence binding with face fxy |
| SPDx | Service Publishing and Discovery module on node x |
| snk | Session nonce indexed by k |
| spx | Service profiles of all available services on node x |
| sv* | Service name prefix of any service available and known by SPD |
| /ndis | First term of the name prefix of neighbor discovery interest and data messages |
| /sdis | First term of the name prefix of service discovery interest and data messages |

FIGS. 3-9 are block diagrams illustrating an exemplary method for establishment of neighbor relations in accordance with a disclosed embodiment. In step 1, shown in FIG. 3, for node "2" 302, when each node 301-303 boots up, the SPD2 312 of node "2" 302 may initially be coupled with the "ccnd2" of node "2" 302 using a specific face "f2s" and may pre-setup two specific FIB entries, e.g. "/ndis: f2s" for neighbor discovery and "/sdis: f2s" for service discovery. Any neighbor discovery interest messages including the pre-defined term "/ndis" and any service discovery interest messages including the pre-defined term "/sdis" may be forwarded to the SPD2 312 of node "2" 302 via the face "f2s" based on the longest prefix match with the two pre-defined FIB entries if there is no exact prefix match.

Node "1" 301 and node "3" 303 perform in a similar manner as node "2" 302 when nodes "1" 301 and "3" 303 boot up.

Figure 4:
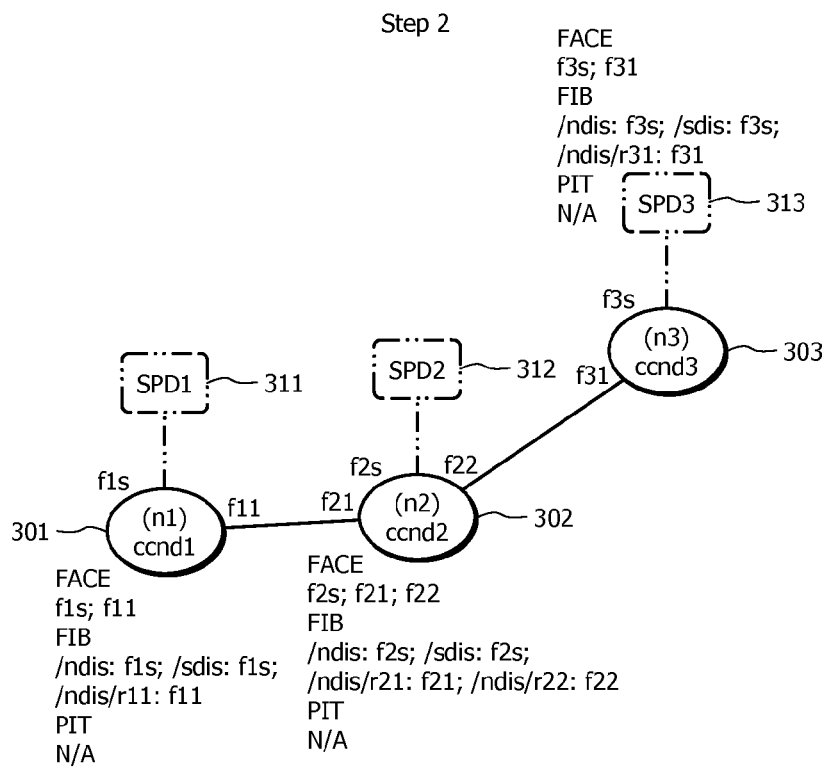

In step 2, shown in FIG. 4, when some nodes 301-303 start to connect to each other and establish new physical links, the LMs (not shown) on each node 301-303 monitors the connectivity of all physical links and notifies the SPD modules 311-313 of the status updates of all physical links. For node "2" 302, when receiving link update notifications from the node "2" 302 LM for new links connected to nodes "1" 301 and "3" 303, the SPD2 312 may first configure and register two new faces "f21" and "f22" on the "ccnd2" on node "2" 302 for the two connected physical links "f21@n2--f11@n1" and "f22@n2--f31@n3". SPD2 312 may also generate a random sequence "r21" binding with the face "f21" as well as a random sequence "r22" binding with the face "f22". SPD2 312 may then setup two new distinct FIB entries, "/ndis/r21: f21" and "/ndis/r22: f22", for the running neighbor discovery.

A random sequence "r21" may be used to create a distinct name prefix "/ndis/r21" of neighbor discovery interest messages and prevent conflictions with existing name prefixes, including "/ndis/r22" on the same node "2", "/ndis/r11" on its neighbor node "1", and "/ndis/r31" on its neighbor nodes "3". Inclusion of the name prefixes may provide that any neighbor discovery interest messages with a distinct name prefix "/ndis/r21" may be forwarded from the source node "2" 302 to the neighbor node "1" 301 via the face "f21" based on the exact prefix match with the existing distinct FIB entry "/ndis/r21: f21".

Nodes "1" 301 and "3" 303 may perform the in a similar manner as node "2" 302 when receiving link update notifications from LM for new links.

Figure 5:
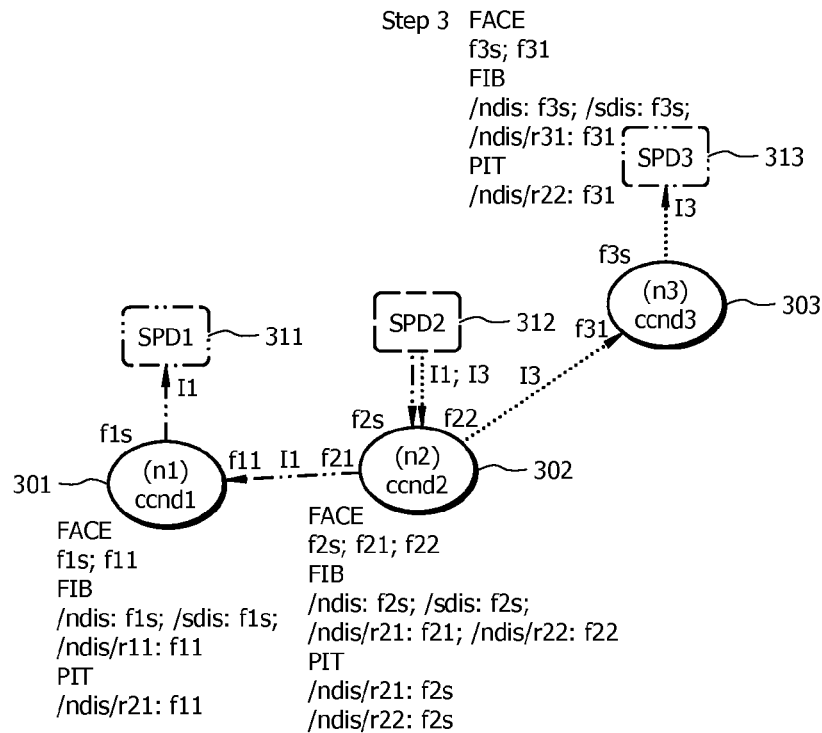

At step 3, shown in FIG. 5, focusing on node "2" 302, the SPD2 312 may independently create two new neighbor discovery interest messages "I1(nm=/ndis/r21)" and "I3 (nm=/ndis/r22)" with distinct name prefixes for the two connected physical links "f21@n2--f11@n1" and "f22@n2--f31@n3" respectively, and then may send the two new neighbor discovery interest messages to the "ccnd2" on node "2" 302 via the face "f2s". The "ccnd2" on node "2" 302 may create two new distinct PIT entries "/ndis/r21: f2s" and "/ndis/r22:f2s" for the two outgoing interest messages "I1(nm=/ndis/r21)" and "I3(nm=/ndis/r22)" respectively. The "ccnd2" on node "2" 302 may forward "I1" to the neighbor "ccnd1" on node "1" 301 via the face "f21" based on the exact prefix match with the existing distinct FIB entry "/ndis/r21: f21". The "ccnd2" may also forward "I3" to the neighbor "ccnd3" on node "3" 303 via the face "f22" based on the exact prefix match with the existing distinct FIB entry "/ndis/r22: f22".

When receiving the incoming interest message "I1 (nm=/ndis/r21)", the "ccnd1" on node "1" 301 may create a new distinct PIT entry "/ndis/r21: f11" and may forward "I1" to the SPD1 311 via the face "f1s" based on the longest prefix match with the pre-defined FIB entry "/ndis: f1s". When receiving the incoming interest message "I3(nm=/ndis/r22)", the "ccnd3" on node "3" 303 may create a new distinct PIT entry "/ndis/r22: f31" and may forward "I3" to the SPD3 313 via the face "f3s" based on the longest prefix match with the pre-defined FIB entry "/ndis: f3s".

Figure 6:
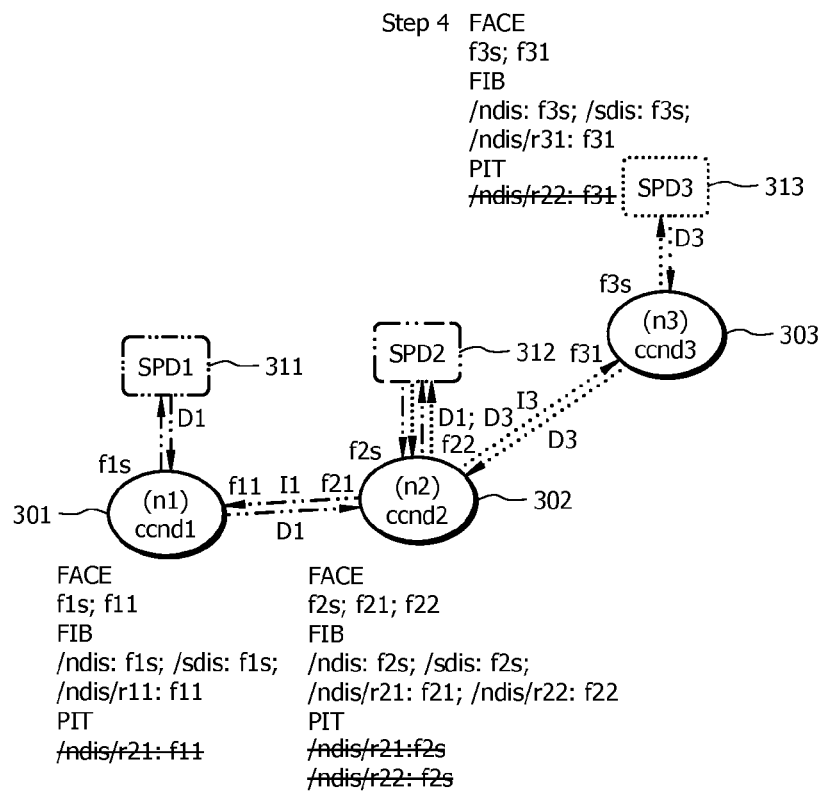

At step 4, shown in FIG. 6, when receiving the interest message "I1(nm=/ndis/r21)", the SPD1 311 may produce a new neighbor discovery data message "D1(nm=/ndis/r21, dp=n1)" with the same name prefix of "I1" containing its own name prefix "n1" in data payload and then may send "D1" back to the "ccnd1" on node "1" 301 via the face "f1s". The "ccnd1" on node "1" 301 may forward the outgoing data message "D1(nm=/ndis/r21, dp=n1)" to the "ccnd2" on node "2" 302 via the face "f11" based on the existing distinct PIT entry "/ndis/r21: f11" and then may remove this PIT entry due to consuming the data message. The "ccnd2" on node "2" 302 may forward the incoming data message "D1(nm=/ndis/r21, dp=n1)" to the SPD2 312 via the face "f2s" based on the existing distinct PIT entry "/ndis/r21: f2s" and may remove this PIT entry due to consuming the data message.

When receiving the interest message "I3(nm=/ndis/r22)", the SPD3 313 may produce a new neighbor discovery data message "D3(nm=/ndis/r22, dp=n3)" with the same name prefix of "I3" containing its own name prefix "n3" in the data payload and then may send "1" back to the "ccnd3" on node "3" 303 via the face "f3s". The "ccnd3" on node "3" 303 may forward the outgoing data message "D3(nm=/ndis/r22, dp=n3)" to the "ccnd2" on node "2" 302 via the face "f31" based on the existing distinct PIT entry "/ndis/r22: f31" and then may remove this PIT entry due to consuming the data message. The "ccnd2" on node "2" 302 may forward the incoming data message "D3(nm=/ndis/r22, dp=n3)" to the SPD2 312 via the face "f2s" based on the existing distinct PIT entry "/ndis/r22: f2s" and may remove this PIT entry due to consuming the data message.

Figure 7:
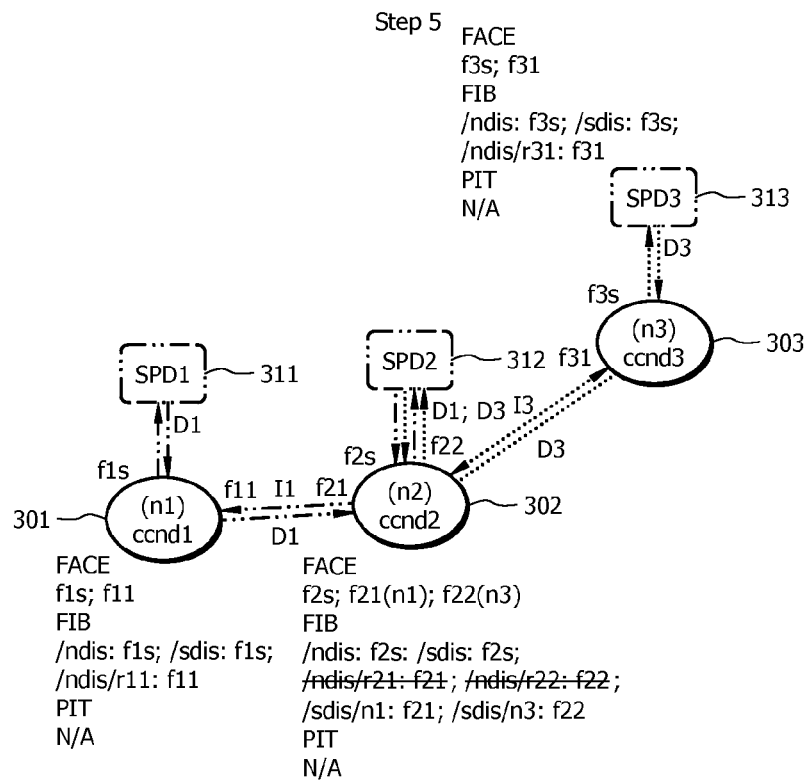

At step 5, shown in FIG. 7, upon finishing step 4, the SPD2 312 may independently retrieve the name prefix "n1" of neighbor node "1" 301 from the data payload of "D1 (nm=/ndis/r21, dp=n1)" and may bind the name prefix "n1" with the face "f21", e.g. f21(n1), by exactly matching the distinct name prefix "/ndis/r21" of "D1" with the existing distinct FIB entry "/ndis/r21: f21". The SPD2 312 may also independently retrieve the name prefix "n3" of neighbor node "3" 303 from the data payload of "D3(nm=/ndis/r22, dp=n3)" and may bind the name prefix "n3" with the face "f22", e.g. f22(n3), by exactly matching the distinct name prefix "/ndis/r22" of "D3" with the existing distinct FIB entry "/ndis/r22: f22". Therefore, the SPDs 311-313 may maintain a mapping list between a certain neighbor's 301-303 name prefix and a certain face.

In addition, for the following service discovery, the SPD2 312 may setup two new distinct FIB entries "/sdis/n1: f21" and "/sdis/n3: f22" using the retrieved name prefix "n1" and "n3" from received data messages "D1" and "D3". The SPD2 312 may then remove the two existing distinct FIB entries "/ndis/r21: f21" and "/ndis/r22: f22" due to the completed mission of the two random sequences "r21" and "r22".

Figure 8:
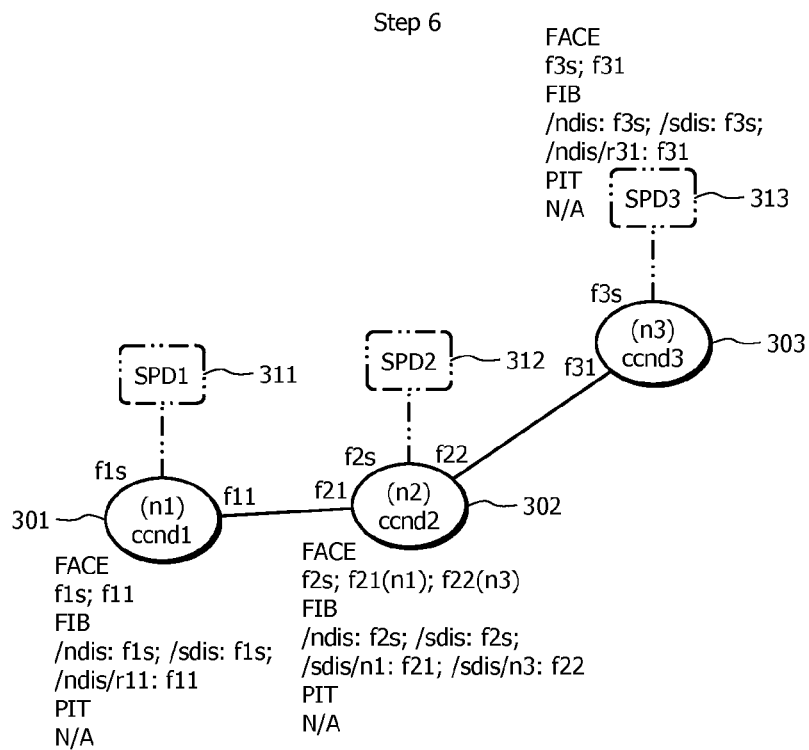

At step 6, shown in FIG. 8, SPD2 312 may make use of a single round of interest-data message exchange to obtain the neighbor's 301 and 303 name prefixes "n1" and "n3" and then may replace the existing distinct FIB entries "/ndis/r21: f21" and "/ndis/r22:f22" for the running neighbor discovery with new distinct FIB entries "/sdis/n1: f21" and "/sdis/n3: f22" for the service discovery described below.

Figure 9:
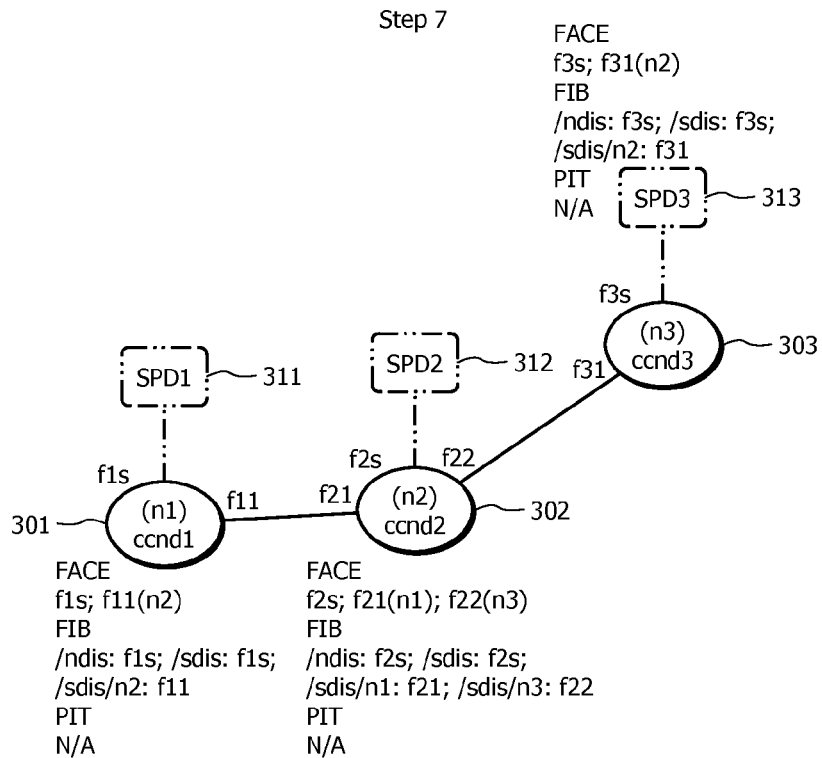

At step 7, shown in FIG. 9, similarly, SPD1 311 and SPD3 313 may independently execute the steps 1-6 above at substantially the same time as SPD2 312, obtain the neighbor's name prefix "n2" and then replace the existing distinct FIB entries "/ndis/r11:f11" and "/ndis/r31: f31" for the running neighbor discovery with new distinct FIB entries "/sdis/n2: f11" and "/sdis/n2: f31" for the service discovery described below. Finally, the steady states of the connected nodes are shown in FIG. 9.

FIGS. 10-13 are block diagrams illustrating an exemplary method for an incoming node joining a group of connected nodes whose neighbor relations are already established according to a disclosed embodiment. At step 1, shown in FIG. 10, before a neighbor node joins, the steady states of the connected nodes are shown in FIG. 9. When a new arrival node "4" 304 starts to connect to a joint node "2" 302 in a group of nodes and establishes a new physical link, Link Managers (LM) on each of nodes "1" 301, "2" 302, and "3" 303 detect the connection of the new physical link and notifies the respective SPD modules 311, 312, 313 of the link status updates.

For node "2" 302, when receiving link update notifications from the LM for node "2" 302 for the new link connected to node "4" 304, the SPD2 312 may first configure and register a new face "f23" on the "ccnd2" of node "2" 302 for the new connected physical links "f23@n2--f41@n4", may generate a random sequence "r23" binding with the face "f23", and may then setup a new distinct FIB entry "/ndis/r23: f23" for the running neighbor discovery.

For node "4" 304, when receiving link update notifications from the LM on node "4" 304 for the new link connected to node "2" 302, the SPD4 314 may first configure and register a new face "f41" on the "ccnd4" for node "4" 304 for the new connected physical links "f41@n4--f23@n2", may generate a random sequence "r41" binding with the face "f41", and then may setup a new distinct FIB entry "/ndis/r41: f41" for the running neighbor discovery.

Figure 10:
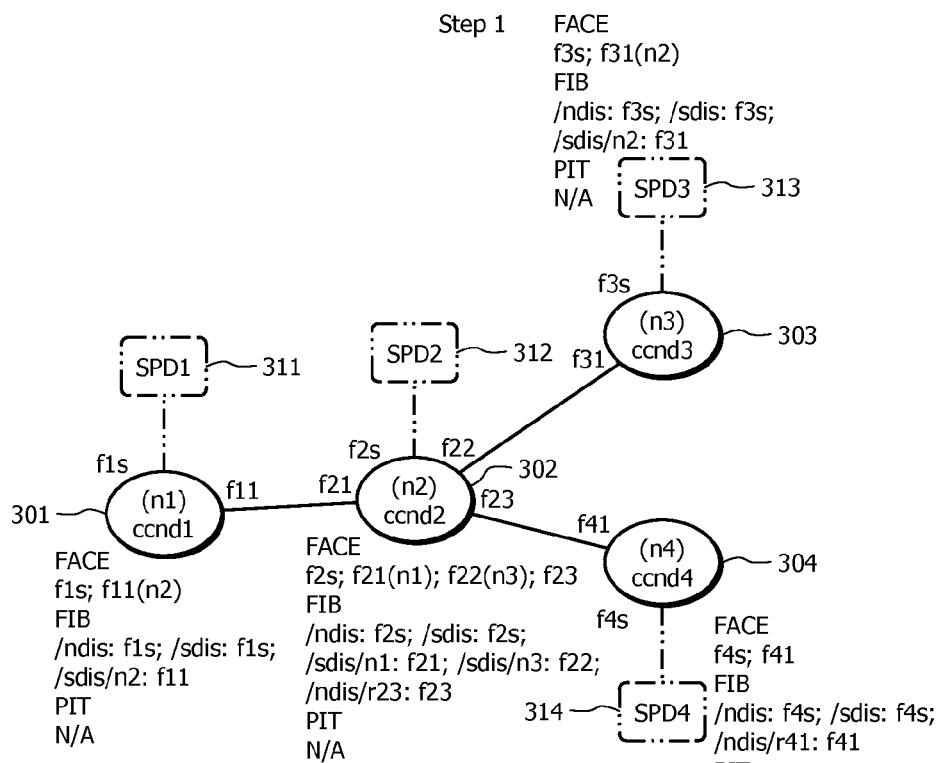
FIGS. 10-13 are block diagrams illustrating an exemplary method for neighbor nodes joining a group of nodes according to a disclosed embodiment.
Figure 11:
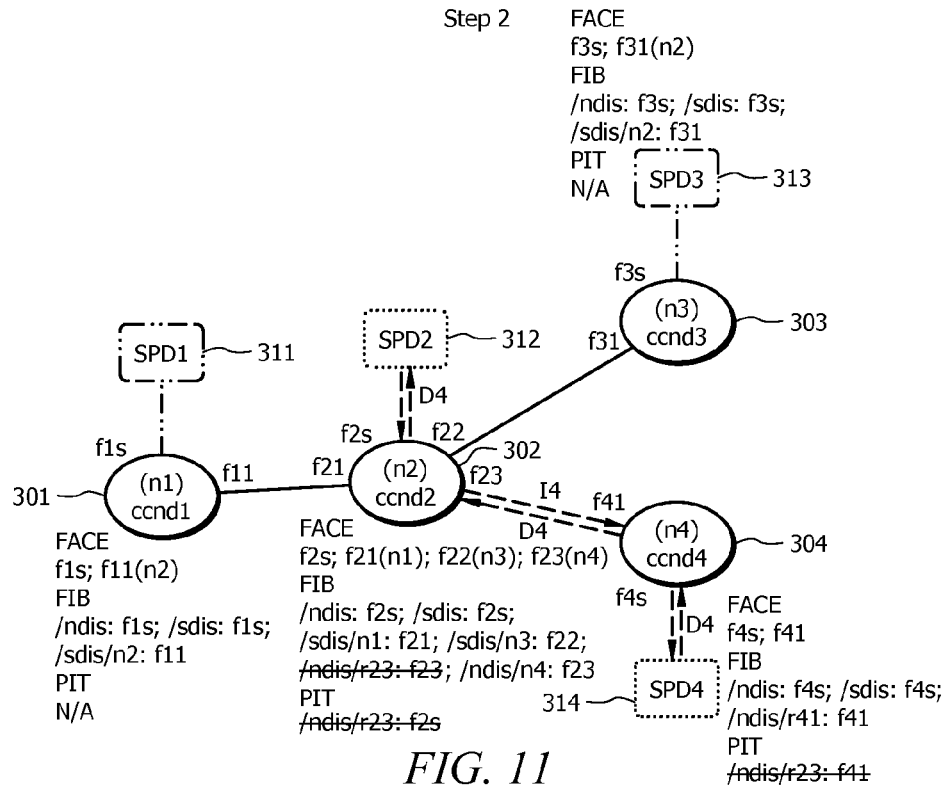

At step 2, shown in FIG. 11, upon finishing Step 1, in FIG. 10, the focus is now on node "2" 302. The SPD2 312 of the joint node "2" 302 may independently execute the aforementioned steps of establishment of neighbor relations by a single round of interest-data message exchange (described above and shown in FIGS. 3-9). The SPD2 302 may first send a neighbor discovery interest message "I4(nm=/ndis/r23)" and may then receive a neighbor discovery data message "D4(nm=/ndis/r23, dp=n4)". The SPD2 312 may obtain the new neighbor's name prefix "n4" and may then replace the existing distinct FIB entry "/ndis/r23: f23" for the running neighbor discovery with new distinct FIB entry "/sdis/n4: f23" for the corresponding service discovery.

Figure 12:
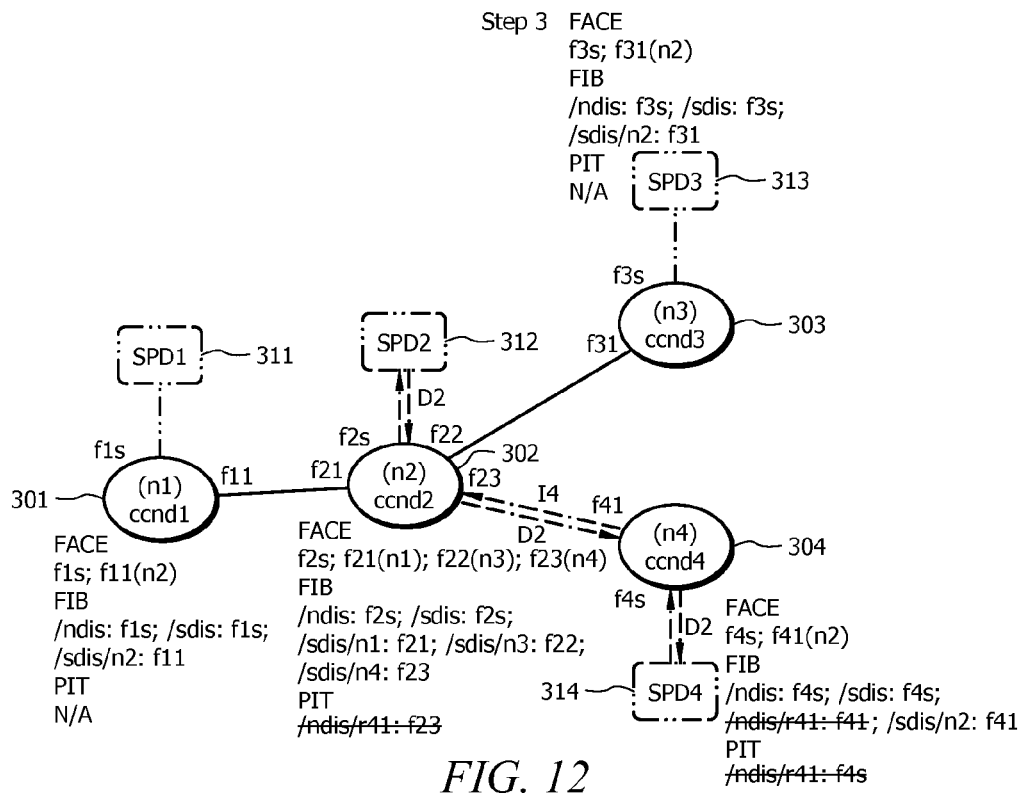

At step 3, shown in FIG. 12, upon finishing Step 1 in FIG. 10, now the focus is on node "4" 304. The SPD4 314 of the new arrival node "4" 304 may independently execute the aforementioned steps of establishment of neighbor relations by a single round of interest-data message exchange (described above and shown in FIGS. 3-9). The SPD4 314 may first send a neighbor discovery interest message "I2(nm=/ndis/r41)" and then may receive a neighbor discovery data message "D2(nm=/ndis/r41, dp=n2)". The SPD4 314 may obtain the new neighbor's name prefix "n2" and then may replace the existing distinct FIB entry "/ndis/r41: f41" for the running neighbor discovery with the new distinct FIB entry "/sdis/n2: f41" for the corresponding service discovery.

Figure 13:
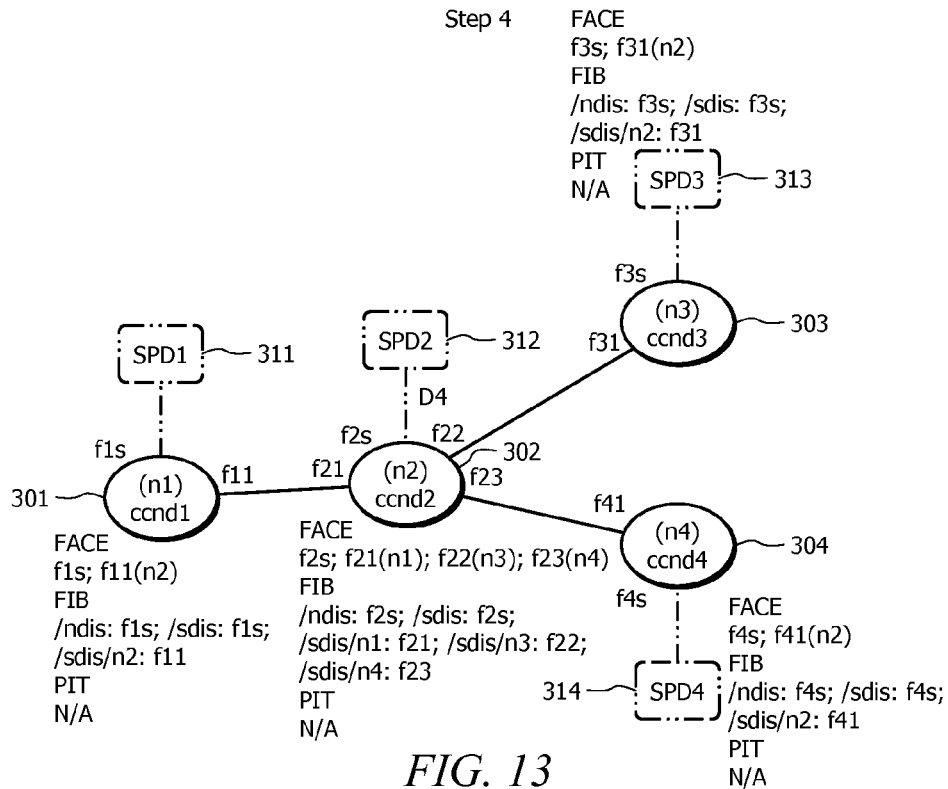

At step 4, shown in FIG. 13, the steady states of the connected nodes 301-304 are shown. Note that the disclosed neighbor node join mechanism, in an embodiment, may only be executed by the just connected nodes involved in establishing a new physical link, while other nodes may not need to perform these operations. As a result, The FACE and FIB entries of the just connected nodes 304 may be updated but the FACE and FIB entries on the other nodes 301-303 may not be changed.

Figure 14:
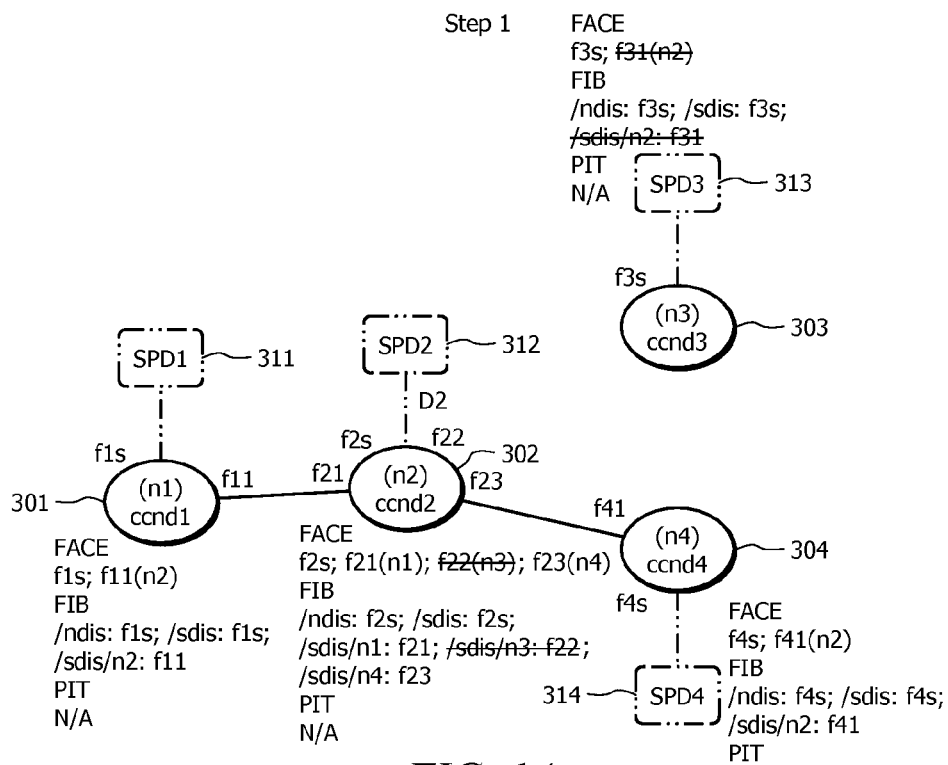
FIGS. 14 and 15 are block diagrams illustrating an exemplary method for a neighbor node leaving a group of nodes in accordance with a disclosed embodiment.
Figure 15:
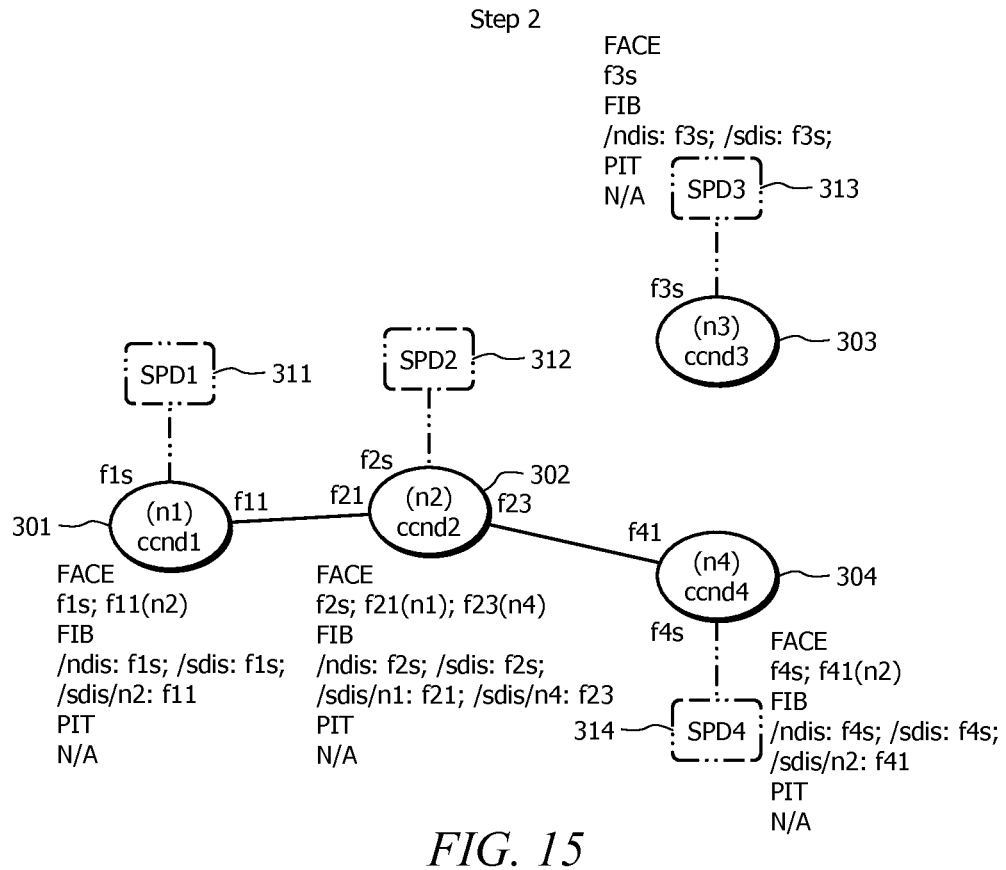

FIGS. 14 and 15 are block diagrams illustrating an exemplary method for an outgoing neighbor node leaving a group of nodes in accordance with a disclosed embodiment. The outgoing node may not be a neighbor node of the group of connected nodes once the outgoing node has exited the group of connected nodes. Before a neighbor node leaves, the steady states of the connected nodes are shown in FIG. 13. At step 1, shown in FIG. 14, when a neighbor node "3"

303 starts to disconnect to a joint node "2" 302 in a group of nodes and drops an existing physical link, Link Managers (LM) on each node 302, 303 may detect the disconnection of the existing physical link and may notify the SPD modules 312, 313 on each node 302, 303 of the link status updates.

For node "2" 302, when receiving link update notifications from the LM for node "2" 302 for the existing link disconnected to node "3" 303, the SPD2 312 may first configure and unregister the dropped face "f22" on the "ccnd2" of node "2" 302 for the new dropped physical links "f22@n2--f31@n3" and may remove the existing distinct FIB entry "/sdis/n3: f22" for the following service discovery.

For node "3" 303, when receiving link update notifications from the LM for node "3" 303 for the existing link disconnected to node "2" 302, the SPD3 313 may first configure and unregister the dropped face "f31" on the "ccnd3" for the new dropped physical links "f31@n3--f22@n2" and may remove the existing distinct FIB entry "/sdis/n2: f31" for the following service discovery.

The steady states of the disconnected nodes are shown in FIG. 15. At step 2, shown in FIG. 15, note that this neighbor node leave mechanism, in one embodiment, may only be executed by the just disconnected nodes 303 involved in dropping an existing physical link, while other nodes 301, 302, 304 may not need to perform these operations. As a result, The FACE and FIB entries of the just disconnected nodes 303 may be updated but the FACE and FIB entries on the other nodes 301, 302, 304 may not be changed.

Turning now to the service discovery protocol, a hop number (h) is introduced as a new attribute of an interest message to define the number of hops required in a service discovery session. An SPD, such as any of SPDs 311-314 described in FIG. 3-15, may be used to process the interest messages reaching a current hop and create new interest messages for a next hop with a new hop number decreased by 1 from the hop number of the interest message received at current hop. If the hop number of a received interest message is equal to 0, the SPD does NOT create new interest messages for a next hop and may reply to the interest message with a data message comprising aggregated and cached service profiles.

A session nonce (sn), which may be a random sequence generated by an application, is introduced as a new attribute of an interest message to distinguish a certain set of interest messages issued from a certain origin node in a certain service discovery session with other interest messages issued from different origin nodes in different sessions. In the same service discovery session, the session nonce may be used to avoid processing the redundant and repeated interest messages and prevent replying to unnecessary and duplicate data messages to these interests. The session nonce provides that if an SPD receives multiple interest messages with the same session nonce, it may only respond to the first received interest message with a data message comprising aggregated service profiles and may discard the following arrived interest messages. The interest messages and PIT entries not responded to with data messages may be vanished or erased when reaching a local timeout for different hop nodes.

A name prefix convention is disclosed to avoid creating undesirable backward interest messages, e.g., an interest message sent from a current hop node to a previous hop node, since the SPD on a current hop node otherwise do not know of a previous hop node in that all incoming interest messages are forwarded by a local ccnd in the middle. Disclosed is a rule of name prefix convention using three terms, e.g., "/sdis/nx2/nx1", where the first term "sdis" may be pre-defined for service discovery interest and data messages, the second term "np" may denote the name prefix of the next hop node (destination), and the third term "nx" may denote the name prefix of the current hop node (source). Therefore, when receiving an interest message with a name prefix "/sdis/nx2/nx1", the SPD on a current hop node "nx2" may determine that the received interest message with name prefix "/sdis/nx2/nx1" comes from a previous hop node "nx1". The SPD on the current hop node may only create new interest message with the name prefix not including "nx1" to unreached next hop nodes and may prevent a backward interest message with name prefix "/sdis/nx2/nx1" being sent from the current hop node "nx2" to the previous hop node "nx1".

FIGS. 16-19 are block diagrams illustrating an exemplary method for 0-hop service discovery according to a disclosed embodiment. At step 1, shown in FIG. 16, before performing service discovery, the application APP1 321 of node "1" 301 may already be coupled with "ccnd1" of node "1" 301 using a specific face "f1a" or coupled with SPD1 311 using some available SPD Application Program Interfaces (APIs). Two specific FIB entries, "/ndis: f1s" and "/sdis: f1s", may have already been setup by SPD1 311 as mentioned in neighbor discovery protocol discussed above. The SPD1 311 may also setup a group of FIB entries "/n1/sv*: f1s" for all local services available and published on SPD1 311 of node "1" 301 and may maintain a list of distinct FIB entries updated by neighbor discovery for neighbor relations (not necessary for in 0-hop service discovery).

For node "1" 301, any service discovery interest messages, including a name prefix "/sdis" or "/n1/sv*: f1s", may be forwarded to the SPD1 311 via the face "f1s" based on the longest prefix match with the two FIB entries.

For 0-hop service discovery, it may be assumed that some service profiles may have already been collected and aggregated by a local SPD and an application may desire to quickly acquire the aggregated service profiles already cached by local the SPD without sending service discovery interest massages to other nodes.

Figure 16:
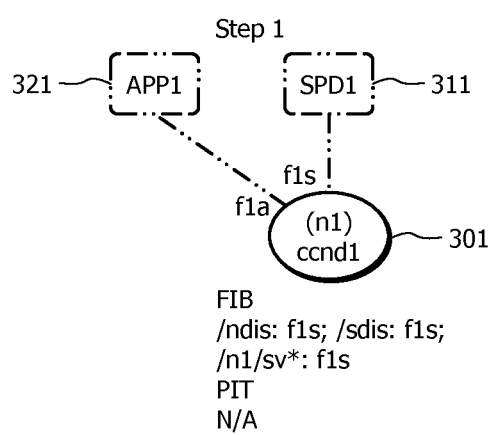
FIGS. 16-19 are block diagrams illustrating an exemplary method for 0-hop service discovery according to a disclosed embodiment.
Figure 17:
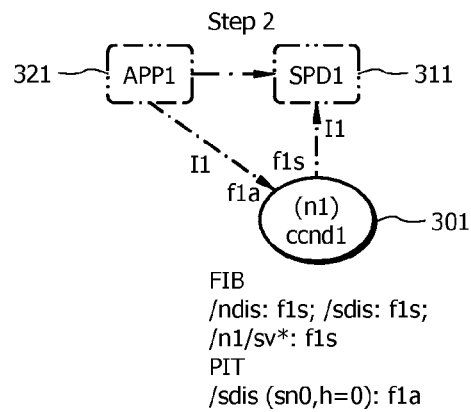

At step 2, shown in FIG. 17, upon completion of step 1 in FIG. 16, the application APP1 321 of node "1" 301 may have two options to quickly acquire the aggregated service profiles already cached by the local SPD 311 using a 0-hop service discovery. One option is that the application APP1 321 may utilize the SPD APIs to request a service discovery and may provide the SPD 311 with a desired hop number "h=0" for 0-hop service discovery and a service discovery session nonce "sn0".

A second option may be that the application APP1 321 may request a service discovery through a local ccnd on node "1" 301 using a single round of interest-data message exchange. In this case, the application APP1 321 may create a new 0-hop service discovery interest message using a pre-defined name prefix "/sdis" and a session nonce "sn0", e.g., "I1(nm=/sdis, sn1, h=0)", and may then send "I1" to the local "ccnd1" on node "1" 301 via the face "f1a". The "ccnd1" on node "1" 301 may create a new PIT entry "/sdis (sn0, h=0): f1a" for the received interest message "I1" and may forward the received interest message "I1" to the local SPD1 311 via the face "f1s" based on the exact prefix match with the pre-defined FIB entry "/sdis: f1s".

Both options may be capable of obtaining the aggregated and cached service profiles from the local SDP 311.

Figure 18:
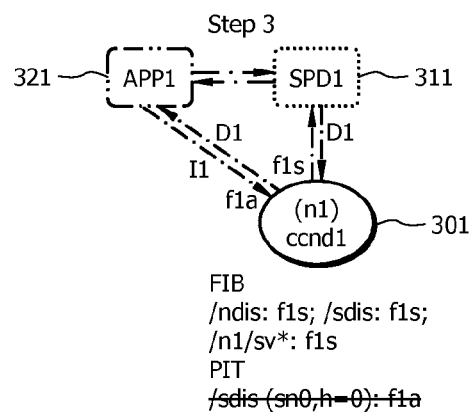

At step 3, shown in FIG. 18, upon finishing step 2 shown in FIG. 17, the SPD1 311 of node "1" 301 may first check if the hop number "h" of a received interest message "I1(nm=/sdis, sn0, h=0)" is equal to 0. In this step "h=0", so the SPD1 311 may not create a new interest messages for next hop and may reply to this interest message "I1" without further delay.

The SPD1 311 of node "1" 301 may have two options to return the aggregated and cached service profiles. One option may be that the SPD1 311 may utilize the SPD APIs to return the aggregated and cached service profiles "sp1" on node "1" 301 to the application APP1 321.

A second option may be that the SPD1 311 may produce a new service discovery data message "D1(nm=/sdis, dp=sp1)" with the same name prefix of "I1" containing the aggregated and cached service profiles "sp1" on node "1" in the data payload and may then send "D1" back to the "ccnd1" of node "1" 301 via the face "f1s". The "ccnd1" of node "1" 301 may forward "D1(nm=/sdis, dp=sp1)" to the application APP1 321 via the face "f1a" based on the existing PIT entry "/sdis (sn0,h=0): f1a" and may remove this PIT entry due to consuming the data message.

Figure 19:
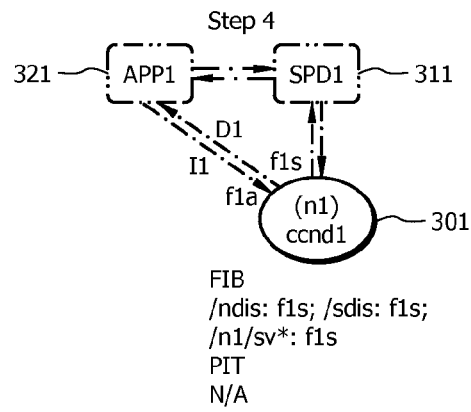

Finally, at step 4, shown in FIG. 19, the application APP1 321 may discover all available services (profiles) known by node "1" 301 in a single service discovery session and may find the first available path from node "1" 301 to any available services on node "1" 301 by tracing the faces of intermediate nodes, e.g., "/n1/sv*: f1s@n1".

FIGS. 20-25 are block diagrams illustrating an exemplary method of discovering a service one-hop away from a node within a group of nodes in accordance with a disclosed embodiment. At step 1, shown in FIG. 20, before performing service discovery, the application APP1 321 of node "1" 301 may already be coupled with "ccnd1" of node "1" 301 using a specific face "f1a" or coupled with SPD1 311 using some available SPD APIs. Two specific FIB entries, "/ndis: f1s" and "/sdis: f1s", may have already been setup by SPD1 311 as mentioned in neighbor discovery protocol. The SPD1 311 may also setup a group of FIB entries, "/n1/sv*: f1s", for all local services available and published on SPD1 311 of node "1" 301 and may maintain a list of distinct FIB entries updated by neighbor discovery for neighbor relations, e.g., "/sdis/n2: f11". Similarly, these requirements may also be satisfied by node "2" 302.

For node "1" 301, any service discovery interest messages including a name prefix "/sdis" or "/n1/sv*: f1s" may be forwarded to the SPD1 311 via the face "f1s" based on the longest prefix match with the two FIB entries and any service discovery interest messages including a distinct name prefix "/sdis/n2" may be forwarded to the "ccnd2" on node "2" 302 via the face "f11" based on the longest prefix match with the existing FIB entry "/sdis/n2: f11". Node "2" 302 may operate in a manner similar to node "1" 301.

Figure 20:
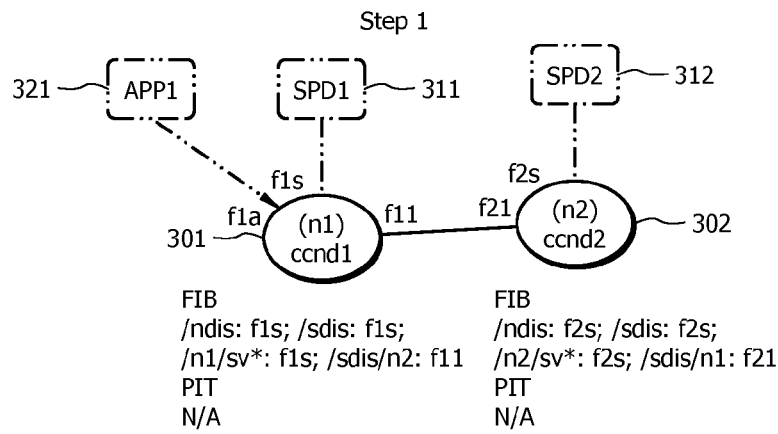
FIGS. 20-25 are block diagrams illustrating an exemplary method of discovering a service on one-hop away within a group of nodes in accordance with a disclosed embodiment.
Figure 21:
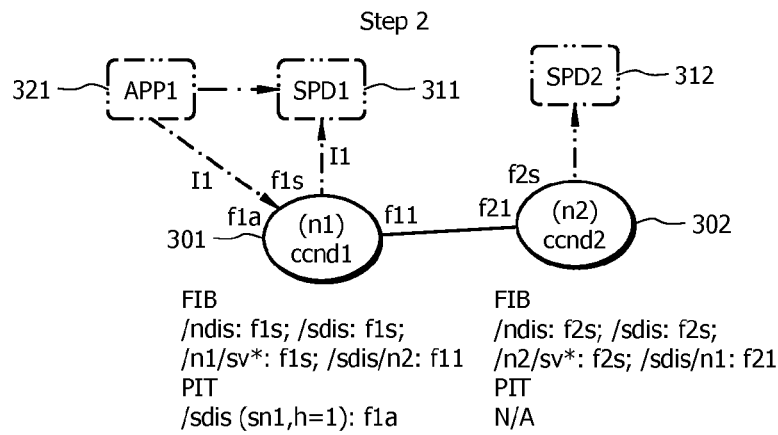

Upon finishing step 1 in FIG. 20, at step 2, shown in FIG. 21, the application APP1 321 of node "1" 301 may have two options to start a new 1-hop service discovery session. One option may be that the application APP1 321 may utilize the SPD APIs to request a service discovery and may provide the SPD 311 with a desired hop number "h=1" for 1-hop service discovery and a service discovery session nonce "sn1".

A second option may be that the application APP1 321 may request a service discovery through the local "ccnd" on node "1" 301 using a single round of interest-data message exchange. In this case, the application APP1 321 may create a new 1-hop service discovery interest message using a pre-defined name prefix "/sdis" and a session nonce "sn1", e.g., "I1(nm=/sdis, sn1, h=1)" and may then send "I1" to the local "ccnd1" on node "1" 301 via the face "f1a". The "ccnd1" on node "1" 301 may create a new PIT entry "/sdis (sn1,h=1): f1a" for the received interest message "I1" and may forward the received interest message "I1" to the local SPD1 311 via the face "f1s", based on the exact prefix match with the pre-defined FIB entry "/sdis: f1s".

Both options may be capable of notifying the local SDP 311 to start a new 1-hop service discovery session and obtaining the new collected and aggregated service profiles from the local SDP 311.

Figure 22:
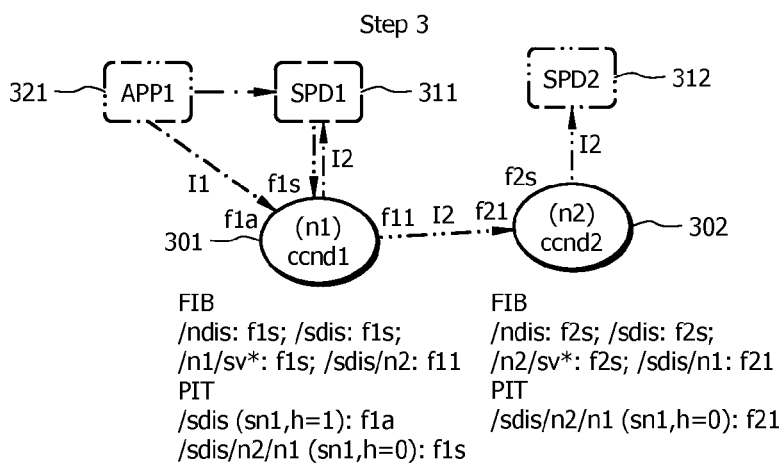

Upon finishing step 2 in FIG. 21, at step 3, shown in FIG. 22, the SPD1 311 of node "1" 301 may first check if the hop number "h" of a received interest message "I1(nm=/sdis, sn1, h=1)" is equal to 0. In this step "h=1", the SPD1 311 may calculate a new hop number of new interest messages for next hop by decreasing the one of the interest message received at current hop by 1, e.g., "h=1−1=0".

Based on the number of the distinct FIB entries updated by neighbor discovery, (in this graph the number of node "1" 301 is 1 for "/sdis/n2: f11"), the SPD1 311 may create a new service discovery interest message using a distinct name prefix "/sdis/n2/n1", the same session nonce "sn1", and the updated next hop number "h=0", e.g. "I2(nm=/sdis/n2/n1, sn1, h=0)", and then sends "I2" to the local "ccnd1" via the face "f1s". The "ccnd1" of node "1" 301 may create a new PIT entry "/sdis/n2/n1 sn1,h=0): f1s" for the outgoing interest message "I2" and may forwards the outgoing interest message "I2" to the "ccnd2" on node "2" 302 via the face "f11", based on the longest prefix match with the existing distinct FIB entry "/sdis/n2: f11".

When receiving the service discovery interest message "I2(nm=/sdis/n2/n1, sn1, h=0)", the "ccnd2" on node "2" 302 may create a new distinct PIT entry "/sdis/n2/n1 (sn1, h=0): f21" for the incoming interest message "I2" and may forward the incoming interest message "I2" to the local SPD2 312 via the face "f2s", based on the longest prefix match with the pre-defined FIB entry "/sdis: f2s".

Figure 23:
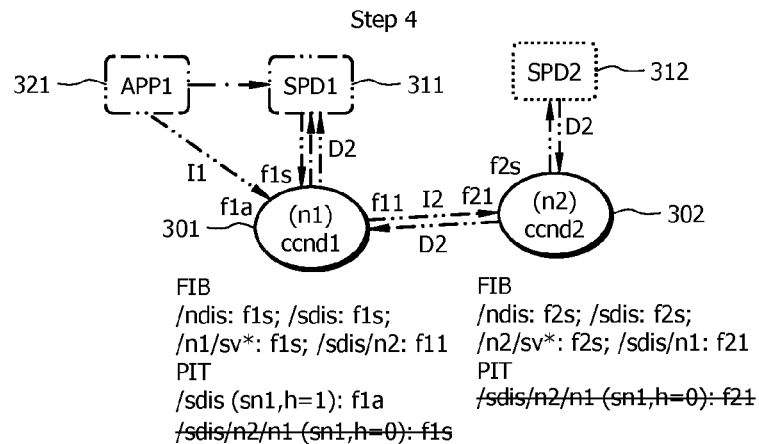

Upon finishing step 3 in FIG. 22, at step 4, shown in FIG. 23, the SPD2 312 of node "2" 302 may first check if the hop number "h" of a received interest message "I2(nm=/sdis/n2/n1, sn1, h=0)" is equal to 0. In this example, "h=0", so the SPD2 312 may not create new interest messages for next hop and may reply to this interest message "I2".

The SPD1 311 may produce a new service discovery data message "D2(nm=/sdis/n2/n1, dp=sp2)" with the same name prefix of "I2" containing the aggregated and cached service profiles "sp2" on node "2" 302 in data payload and may then send "D2" back to the "ccnd2" on node "2" 302 via the face "f2s". The "ccnd2" on node "2" 302 may forward the outgoing data message "D2(nm=/sdis/n2/n1, dp=sp2)" to the "ccnd1" on node "1" 301 via the face "f21" based on the existing distinct PIT entry "/sdis/n2/n1 (sn1, h=0): f21" and may remove this PIT entry due to consuming the data message.

When receiving the service discovery data message "D2 (nm=/sdis/n2/n1, dp=sp2)", the "ccnd1" on node "1" 301 may forward the incoming data message "D2" to the SPD1 311 via the face "f1s" based on the existing distinct PIT entry "/sdis/n2/n1 (sn1,h=0): f1s" and may remove this PIT entry due to consuming the data message.

Figure 24:
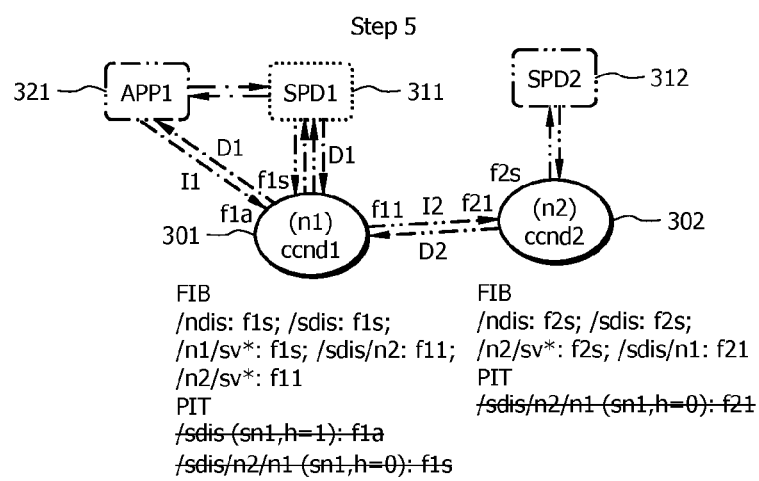

Upon completing step 4 in FIG. 23, at step 5, shown in FIG. 24, the SPD1 311 may retrieve the updated service profiles "sp'2" on node "2" 302 from the data payload of "D2(nm=/sdis/n2/n1, dp=sp'2)", may aggregate "sp'2" with the cached service profiles "sp1" on node "1" 301 (sp'1=sp'2+sp1), and may then store the collected and aggregated service profiles "sp'1" in a cache. The SPD1 311 may also trace the face of local "ccnd" on node "1" 301 receiving the incoming data message "D2(nm=/sdis/n2/n1, dp=sp'2)"

by longest matching the distinct name prefix "/sdis/n2/n1" of "D2" with the existing distinct FIB entry "/sdis/n2: f11" and may setup a new group of FIB entries "/n2/sv*: f11" on node "1" 301 using the traced the face "f11" for all available services published on SPD2 312 of node "2" 302.

The SPD 1 311 may have two options to return the new collected and aggregated service profiles. One option may be that the SPD1 311 may utilize the SPD APIs to return the new collected and aggregated service profiles "sp'1" on node "1" 301 to the application "APP1" 321.

A second option may be that the SPD1 311 may produce a new service discovery data message "D1(nm=/sdis, dp=sp'1)" with the same name prefix of "I1" containing the new collected and aggregated service profiles "sp'1" on node "1" 301 in data payload and may then send "D1" back to the "ccnd1" on node "1" 301 via the face "f1s". The "ccnd1" on node "1" 301 may forward "D1(nm=/sdis, dp=sp'1)" to the application APP1 321 via the face "f1a" based on the existing PIT entry "/sdis (sn1, h=1): f1a" and may remove this PIT entry due to consuming the data message.

Figure 25:
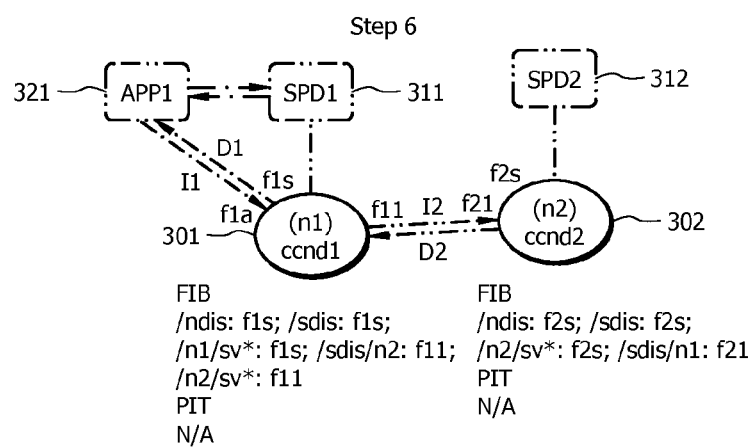

Finally, at step 6, shown in FIG. 25, the application APP1 321 may discover all available services (profiles) known by node "1" 301 and node "2" 302 within 1-hop scope from node "1" 301 in a single service discovery session and may find the first available path from node "1" 301 to any available services on node "1" 301 and node "2" 302 by tracing the faces of intermediate nodes, i.e. "/n1/sv*: f1s@n1" and "/n2/sv*: f11@n1--f2s@n2".

Figure 26:
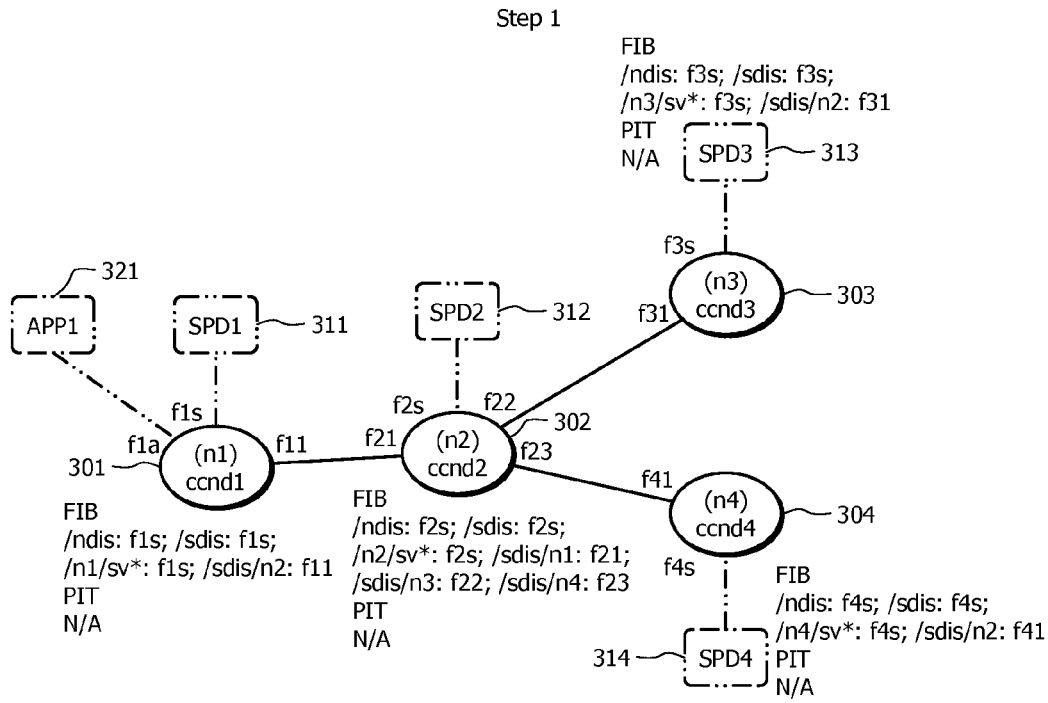
FIGS. 26-33 are block diagrams illustrating an exemplary method for 2-hop service discovery according to a disclosed embodiment.

FIGS. 26-33 are block diagrams illustrating an exemplary method for 2-hop service discovery according to a disclosed embodiment. As used herein, 2-hops means a destination node is separated from an origin node by an intermediary node. Step 1 in the disclosed 2-hop service discovery method is shown in FIG. 26. Before performing service discovery, the application APP1 321 of node "1" 301 may already be coupled with "ccnd1" of node "1" 301 using a specific face "f1a" or coupled with SPD1 311 using some available SPD APIs. Two specific FIB entries, "/ndis: f1s" and "/sdis: f1s", may have already been setup by SPD1 311 as mentioned in neighbor discovery protocol. The SPD1 311 may also setup a group of FIB entries, "/n1/sv*: f1s", for all local services available and published on SPD1 311 of node "1" 301 and may maintain a list of distinct FIB entries updated by neighbor discovery for neighbor relations, e.g., "/sdis/n2: f11". Similarly, these conditions may also be satisfied by node "2" 302, node "3" 303, and node "4" 304.

For node "1" 301, any service discovery interest messages including a name prefix "/sdis" or "/n1/sv*: f1s" may be forwarded to the SPD1 311 via the face "f1s" based on the longest prefix match with the two FIB entries and any service discovery interest messages including a distinct name prefix "/sdis/n2" may be forwarded to the "ccnd2" on node "2" 302 via the face "f11" based on the longest prefix match with the existing FIB entry "/sdis/n2: f11". For node "2" 302, node "3" 303, and node "4" 304, service discovery interest messages may be treated in a similar fashion.

Figure 27:
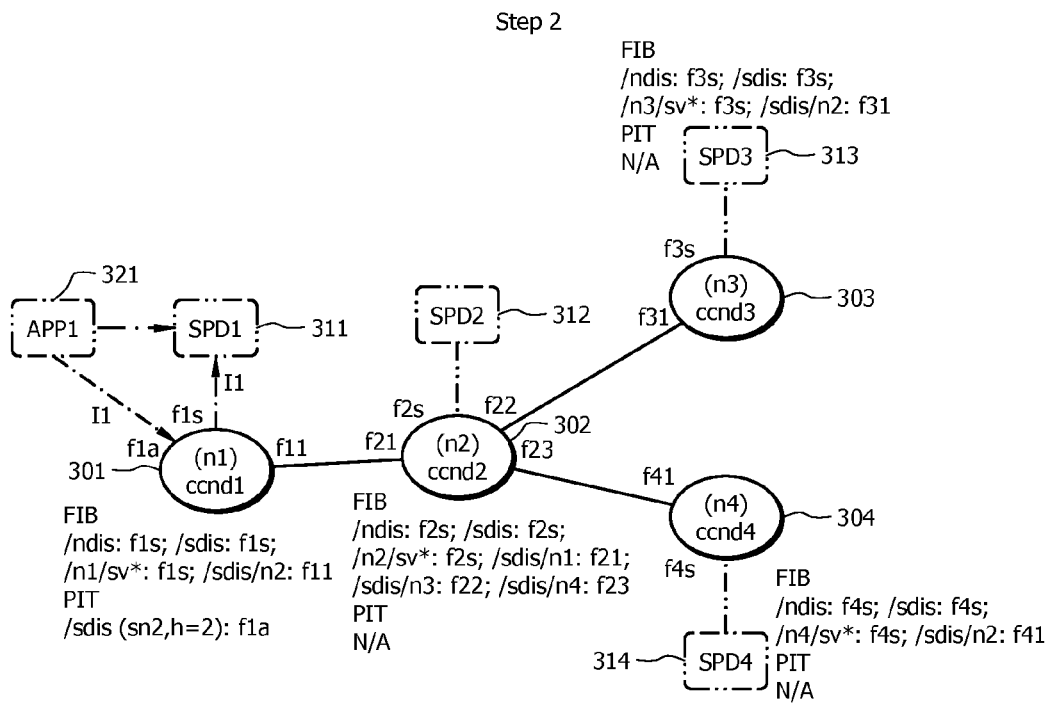

Upon finishing step 1 shown in FIG. 26, at step 2, shown in FIG. 27, the application APP1 321 of node "1" 301 may have two options to start a new 2-hop service discovery session. One option may be that the application APP1 321 may utilize the SPD APIs to request a service discovery and may provide the SPD1 311 with a desired hop number "h=2" for 2-hop service discovery and a service discovery session nonce "sn2".

A second option may be that the application APP1 321 may request a service discovery through local ccnd using a single round of interest-data message exchange. In this case, the application APP1 321 may create a new 2-hop service discovery interest message using a pre-defined name prefix "/sdis" and a session nonce "sn1", e.g., "I1(nm=/sdis, sn2, h=2)" and may then send "I1" to local "ccnd1" on node "1" 301 via the face "f1a". The "ccnd1" on node "1" 301 may create a new PIT entry "/sdis (sn2, h=2): f1a" for the received interest message "I1" and may forward the received interest message "I1" to the local SPD1 311 via the face "f1s" based on the exact prefix match with the pre-defined FIB entry "/sdis: f1s".

Both options may be capable of notifying a local SDP to start a new 2-hop service discovery session and then obtain the new collected and aggregated service profiles from local SDP.

Upon finishing step 2 in FIG. 27, at step 3, shown in FIG. 38, the SPD1 311 of node "1" 301 may first check if the hop number "h" of a received interest message "I1(nm=/sdis, sn2, h=2)" is equal to 0. In this step "h=2", the SPD1 311 may calculate a new hop number of new interest messages for next hop by decreasing the hop number of the interest message received at current hop by 1, e.g., "h=2−1=1".

Based on the number of the distinct FIB entries updated by neighbor discovery, (in this graph the number of node "1" is 1 for "/sdis/n2: f11"), the SPD1 311 may create a new service discovery interest message using a distinct name prefix "/sdis/n2/n1", the same session nonce "sn1", and the updated next hop number "h=1", e.g., I2(nm=/sdis/n2/n1, sn2, h=1)", and may then send "I2" to the local "ccnd1" on node "1" 301 via the face "f1s". The "ccnd1" on node "1" 301 may create a new PIT entry "/sdis/n2/n1 (sn2, h=1): f1s" for the outgoing interest message "I2" and may forward the outgoing interest message "I2" it to the "ccnd2" on node "2" 302 via the face "f11", based on the longest prefix match with the existing distinct FIB entry "/sdis/n2: f11".

When receiving the service discovery interest message "I2(nm=/sdis/n2/n1, sn2, h=1)", the "ccnd2" on node "2" 302 may create a new distinct PIT entry "/sdis/n2/n1 (sn2, h=1): f21" for the incoming interest message "I2" and may forwards the incoming interest message "I2" to the local SPD2 312 via the face "f2s" based on the longest prefix match with the pre-defined FIB entry "/sdis: f2s".

Figure 28:
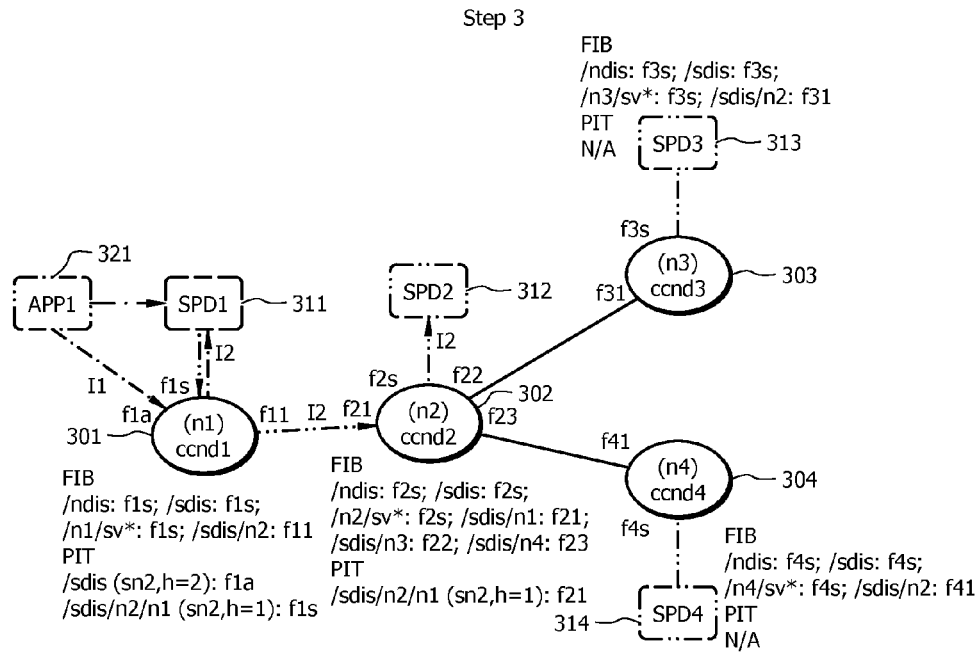
Figure 29:
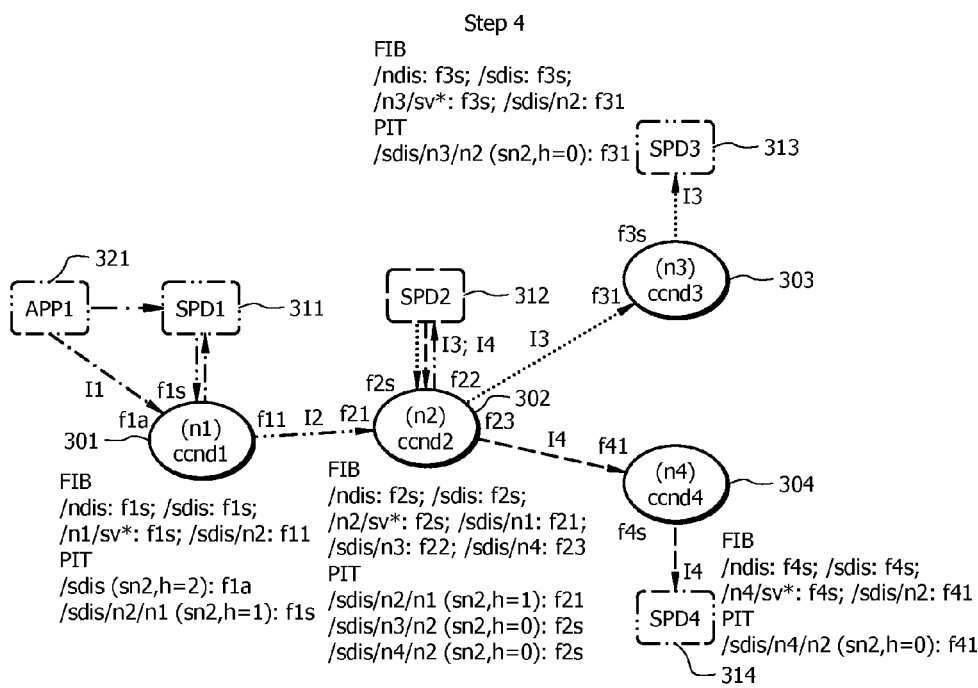

Upon finishing step 3 shown in FIG. 28, at step 4, shown in FIG. 29, the SPD2 312 of node "2" 302 may first check if the hop number "h" of a received interest message is equal to 0. In this step "h=1", the SPD2 312 may calculate a new hop number of new interest messages for next hop by decreasing the one of the interest message received at current hop by 1, e.g. "h=1−1=0". Due to the disclosed name prefix convention, the SPD2 312 may know the received interest message with name prefix "/sdis/n2/n1" comes from the previous hop node "n1" and may prevent the backward interest message with name prefix "/sdis/n1/n2" from being sent from the current hop node "n2" to the previous hop node "n1".

Based on the number of the distinct FIB entries updated by neighbor discovery, (in this graph the number of node "2" is 3 for "/sdis/n1: f21", "/sdis/n3: f22" and "/sdis/n4: f23", but excluding the name prefix "/sdis/n1/n2"), the SPD2 312 may only create two new service discovery interest messages using two distinct name prefixes, "/sdis/n3/n2" and "/sdis/n4/n2", the same session nonce "sn2", and the updated next hop number "h=0", e.g., "I3(nm=/sdis/n3/n2, sn2, h=0)" and "I4(nm=/sdis/n4/n2, sn2, h=0)" respectively, and may then send "I3" and "I4" to the local "ccnd2" on node "2" 302 via the face "f2s". The "ccnd2" on node "2" 302 may create two new PIT entries, "/sdis/n3/n2 (sn2, h=0): f2s" and "/sdis/n4/n2 (sn2, h=0): f2s", for the two outgoing interest messages respectively. The SPD2 312 may forward "I3" to the "ccnd3" on node "3" 303 via the face "f22" based on the longest prefix match with the existing distinct FIB entry "/sdis/n3: f22" and may forward "I4" to the "ccnd4" on node "4" 304 via the face "f23" based on the longest prefix match with the existing distinct FIB entry "/sdis/n4: f23".

When receiving the service discovery interest message with "I3(nm=/sdis/n3/n2, sn2, h=0)", the "ccnd3" on node "3" 303 may create a new distinct PIT entry "/sdis/n3/n2 (sn2, h=0): f31" for the incoming interest message "I3" and may forwards the incoming interest message "I3" to the SPD3 313 via the face "f3s" based on the longest prefix match with the pre-defined FIB entry "/sdis: f3s". When receiving the service discovery interest message "I4(nm=/sdis/n4/n2, sn2, h=0)", the "ccnd4" on node "4" 304 may create a new distinct PIT entry "/sdis/n4/n2 (sn2, h=0): f41" for the incoming interest message "I4" and may forwards the incoming interest message "I4" to the SPD4 314 via the face "f4s" based on the longest prefix match with the pre-defined FIB entry "/sdis: f4s".

Figure 30:
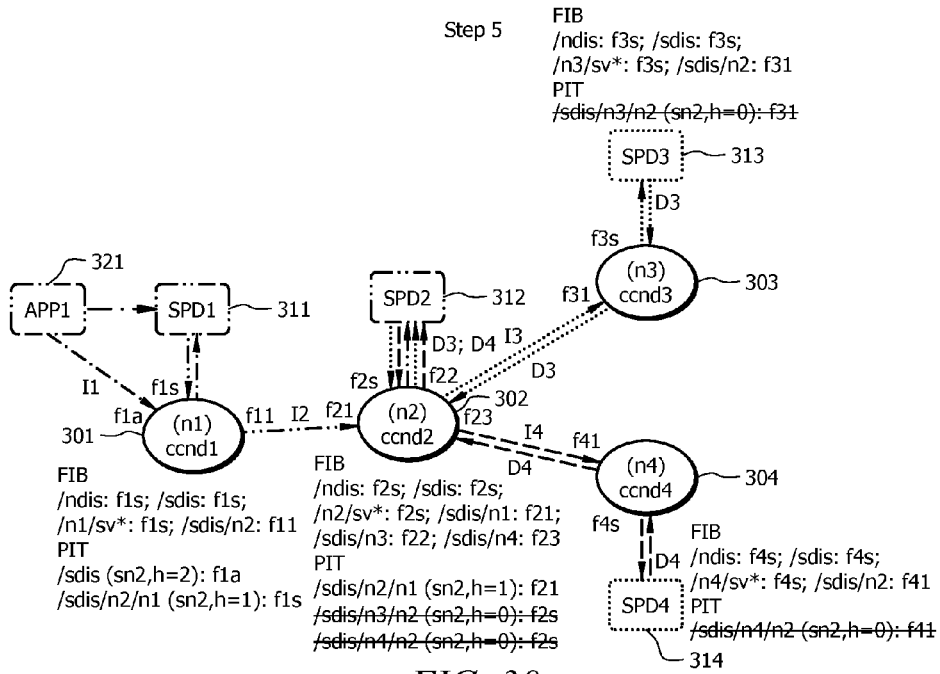

At step 5, shown in FIG. 30, the SPD3 313 and SPD4 314 may first check if the hop number "h" of received interest messages "I3(nm=/sdis/n3/n2, sn2, h=0)" and "I4(nm=/sdis/n4/n2, sn2, h=0)" is equal to 0. In this step "h=0", so the SPD3 313 and SPD4 314 may not create new interest message for next hop and may reply to the interest messages "I3" and "I4".

On the one hand, the SPD3 313 may produce a new service discovery data message "D3(nm=/sdis/n3/n2, dp=sp3)" with the same name prefix of "I3" containing the aggregated and cached service profiles "sp3" on node "3" 303 in data payload and may then send "D3" back to the "ccnd3" on node "3" 303 via the face "f3s". The "ccnd3" on node "3" 303 may forward the outgoing data message "D3(nm=/sdis/n3/n2, dp=sp3)" to the "ccnd2" on node "2" 302 via the face "f31" based on the existing distinct PIT entry "/sdis/n3/n2 (sn2, h=0): f31" and may remove this PIT entry due to consuming the data message.

When receiving the service discovery data message "D3 (nm=/sdis/n3/n2, dp=sp3)", the "ccnd2" on node "2" 302 may forward the incoming data message "D3" to the SPD2 312 via the face "f2s" based on the existing distinct PIT entry "/sdis/n3/n2 (sn2, h=0): f2s" and may remove this PIT entry due to consuming the data message.

On the other hand, the SPD4 314 may produce a new service discovery data message "D4(nm=/sdis/n4/n2, dp=sp4)" with the same name prefix of "I4" containing the aggregated and cached service profiles "sp4" on node "4" 304 in data payload and may then send "D4" back to the "ccnd4" on node "4" 304 via the face "f4s". The "ccnd4" on node "4" 304 may forward the outgoing data message "D4(nm=/sdis/n4/n2, dp=sp4)" to the "ccnd2" on node "2" 302 via the face "f41" based on the existing distinct PIT entry "/sdis/n4/n2 (sn2, h=0): f41" and may remove this PIT entry due to consuming the data message.

When receiving the service discovery data message "D4 (nm=/sdis/n4/n2, dp=sp4)", the "ccnd2" on node "2" 302 may forward the incoming data message "D4" to the "SPD2" via the face "f2s" based on the existing distinct PIT entry "/sdis/n4/n2 (sn2, h=0): f2s" and may remove this PIT entry due to consuming the data message.

Figure 31:
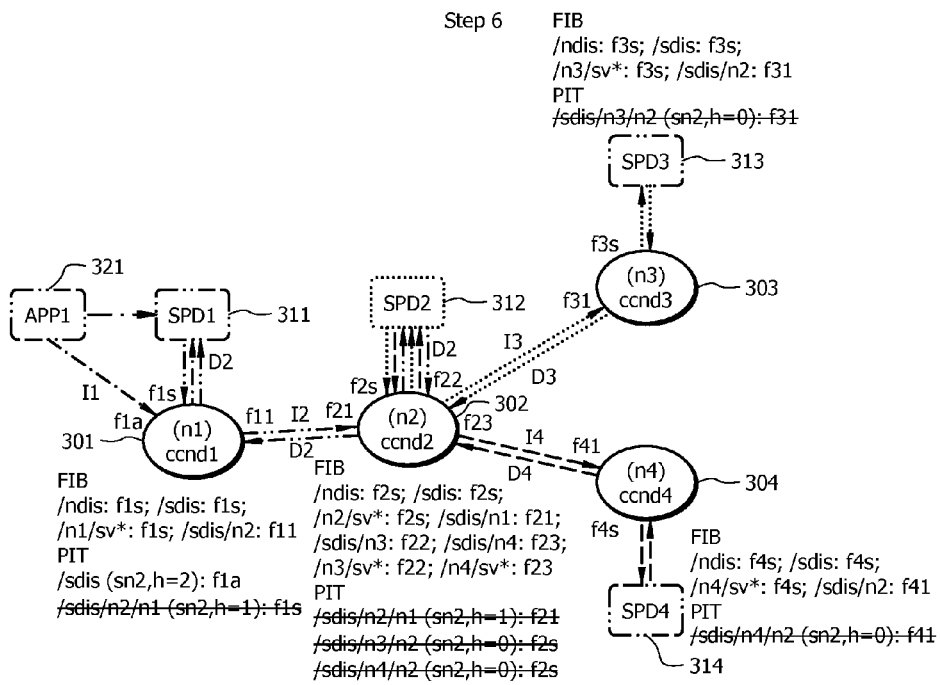

At step 6, shown in FIG. 31, the SPD2 312 of node "2" 302 may receive two new data message containing the aggregated service profiles on node "3" 303 and node "4" 304, may aggregate the received service profiles on node "3" 303 and node "4" 304 with the cached service profiles on node "2" 302, may generate new collected and aggregated service profiles on node "2" 302, and may then store new collected and aggregated service profiles in a cache.

The SPD2 312 may retrieve the cached service profiles "sp3" on node "3" 303 from the data payload of "D3(nm=/sdis/n3/n2, dp=sp3)" and the cached service profiles "sp4" on node "4" 304 from the data payload of "D4(nm=/sdis/n4/n2, dp=sp4)", may aggregate "sp3" and "sp4" with the cached service profiles "sp2" on node "2" 302 (sp'2=sp4+sp3+sp2), and may then store the collected and aggregated service profiles "sp'2" in a cache. The SPD2 312 may also trace the face of local "ccnd" receiving the incoming data message "D3(nm=/sdis/n3/n2, dp=sp3)" and "D4(nm=/sdis/n4/n2, dp=sp4)" by longest matching the distinct name prefixes "/sdis/n3/n2" of "D3" and "/sdis/n4/n2" of "D4" with the existing distinct FIB entries "/sdis/n3: f22" and "/sdis/n4: f23" and may setup two new groups of FIB entries "/n3/sv*: f22" and "/n4/sv*: f23" on node "2" using the traced the face "f22" and "f23" for all available services published on "SPD3" of node "3" and "SPD4" of node "4".

The SPD2 312 may produce a new service discovery data message "D2(nm=/sdis/n2/n1, dp=sp'2)" with the same name prefix of "I2" containing the new collected and aggregated service profiles "sp'2" on node "2" 302 in data payload and may then send "D2" back to the "ccnd2" on node "2" 302 via the face "f2s". The "ccnd2" on node "2" 302 may forward the outgoing data message "D2(nm=/sdis/n2/n1, dp=sp'2)" to the "ccnd1" on node "1" 301 via the face "f21" based on the existing distinct PIT entry "/sdis/n2/n1 (sn2, h=1): f21" and may remove this PIT entry due to consuming the data message.

When receiving the service discovery data message "D2 (nm=/sdis/n2/n1, dp=sp'2)", the "ccnd1" on node "1" 301 may forward the incoming data messages "D2" to the SPD1 311 via the face "f1s" based on the existing distinct PIT entry "/sdis/n2/n1 (sn2, h=1): f2s" and may remove this PIT entry due to consuming the data message.

Figure 32:
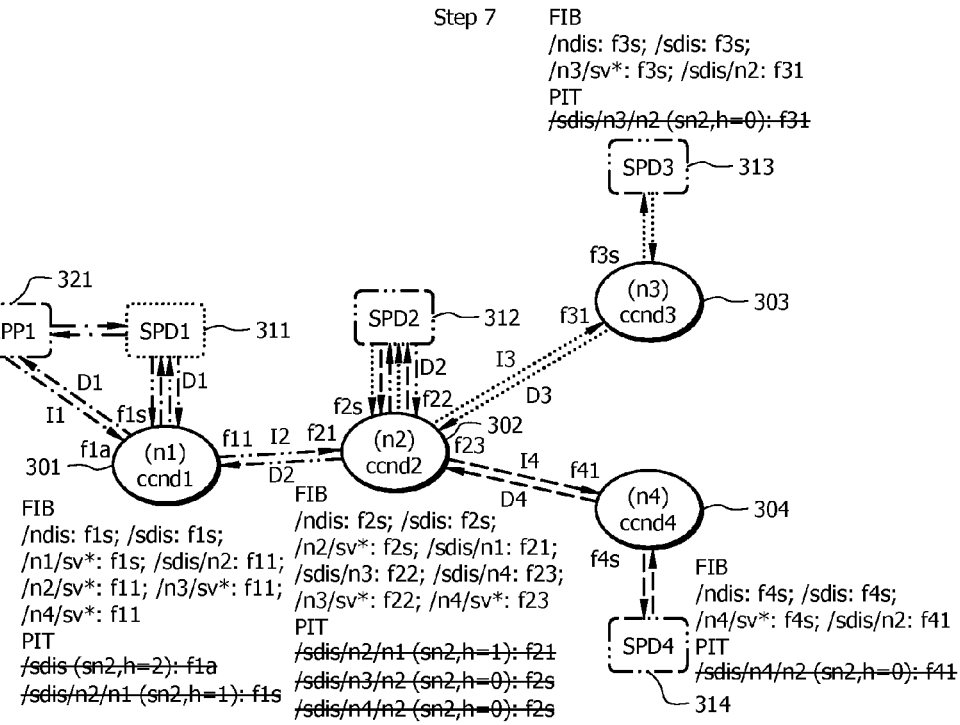

At step 7, shown in FIG. 32, the SPD1 311 may retrieve the updated service profiles "sp'2" on node "2" 302 from the data payload of "D2(nm=/sdis/n2/n1, dp=sp'2)", may aggregate "sp'2" with the cached service profiles "sp1" on node "1" 301 (sp'1=sp'2+sp1=sp4+sp3+sp2 +sp1), and may then store the collected and aggregated service profiles "sp'1" in a cache. The SPD1 311 may also trace the face of local "ccnd" receiving the incoming data message "D2(nm=/sdis/n2/n1, dp=sp'2)" by longest matching the distinct name prefix "/sdis/n2/n1" of "D2" with the existing distinct FIB entry "/sdis/n2: f11" and may setup a new group of FIB entries "/n2/sv*: f11" on node "1" 301 using the traced the face "f11" for all available services published on SPD2 312 of node "2" 302, SPD3 313 of node "3" 303, and SPD4 314 of node "4" 304.

The SPD 1 311 may have two options to return the new collected and aggregated service profiles. One option may be that the SPD1 311 may utilize the SPD APIs to return the new collected and aggregated service profiles "sp'1" on node "1" 301 to the application APP1 321.

A second option may be that the SPD1 311 may produce a new service discovery data message "D1(nm=/sdis, dp=sp'1)" with the same name prefix of "I1" containing the new collected and aggregated service profiles "sp'1" on node "1" in data payload and may then send "D1" back to the "ccnd1" on node "1" 301 via the face "f1s". The "ccnd1" on node "1" 301 may forward "D1(nm=/sdis, dp=sp'1)" to the application APP1 321 via the face "f1a" based on the existing PIT entry "/sdis (sn2, h=2): f1a" and may remove this PIT entry due to consuming the data message.

Figure 33:
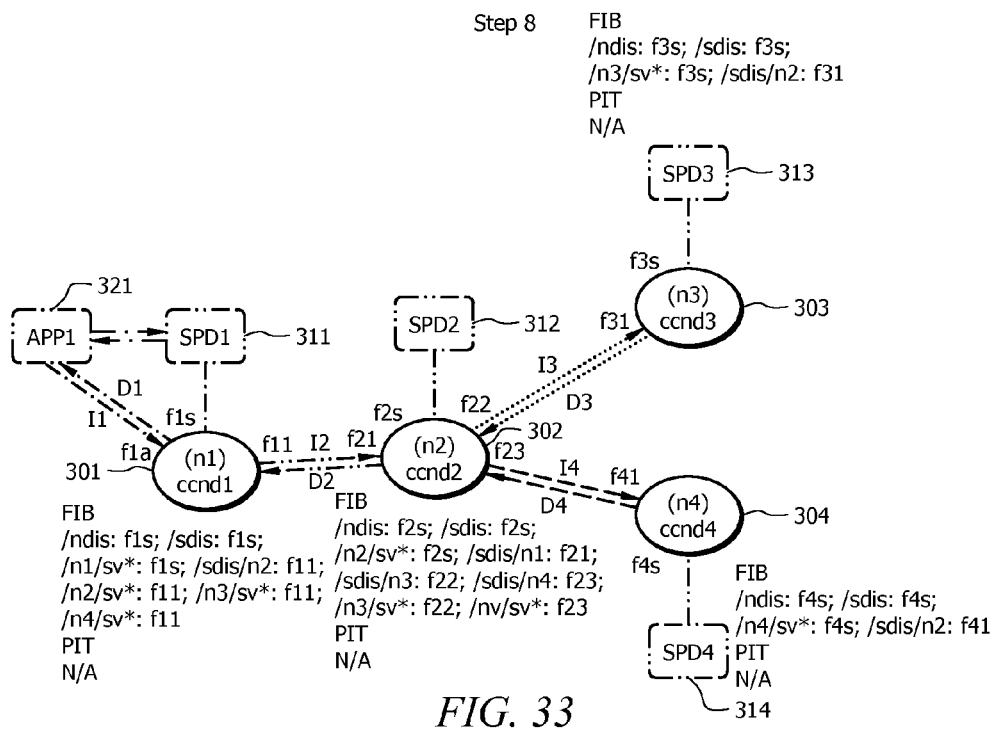

Finally, at step 8, shown in FIG. 33, the application APP1 321 may discover all available services (profiles) known by node "1" 301, node "2" 302, node "3" 303, and node "4" 304 within a 2-hop scope from node "1" 301 in a single service discovery session and may find the first available path from node "1" 301 to any available services on node "1" 301, node "2" 302, node "3" 303, and node "4" 304 by tracing the faces of intermediate nodes, e.g., "/n1/sv*: f1s@n1", "/n2/sv*: f11@n1--f2s @n2", "/n3/sv*: f11@n1--f22@n2--f3s@n3" and "/n4/sv*: f11@n1--423@n2--f4s @n4".

The disclosed name-based service discovery protocol may be capable of readily extension to a multiple-hop service discovery scenario due to the aforementioned design principles and proposed schemes using interest-data message exchanges.

By defining different hop number, an SPD may control the discovery scope in the network. Also, an SPD may specify discovery parameters, such that only service descriptions satisfying the parameters will be returned by individual nodes, similar to that in Zeroconf. This enables discovery by domain, type, and other parameters.

Described herein is one use case of multiple-hop service discovery to explain how the protocol may be used to build a path from an initiator of ccn node. Suppose, for example, an APP1 321 in FIGS. 16-33 wants to explore the possible paths from itself to a dedicated node, for example, ccnd4 304. For each CCN node, a local service publishes a service profile with its name, i.e., name_profile={n4}. During a discovery protocol, each node may receive profiles, aggregate the profiles with its own local name_profile, and may respond back to the discovery interest. For example, SPD3 313 may respond with D3={n3}, SPD4 314 may respond with D4={n4}, and SPD2 312 may respond with D2=D4+D3={n2, {n3, n4}}. When SPD1 311 receives these responses, SPD1 311 may forward the responses back to APP1 321, which can then identify a path of {n1, n4} to reach ccnd4 on node "4" 304.

In general, there may be multiple paths available to reach a single destination node. The initiator may select one. Also, the initiator may periodically send discovery interests to update the path(s).

It may be noted that path discovery may be a very important function for a topologically dynamic network, such as a sensor network, an ad-hoc network, and an internet-of-things.

Figure 34:
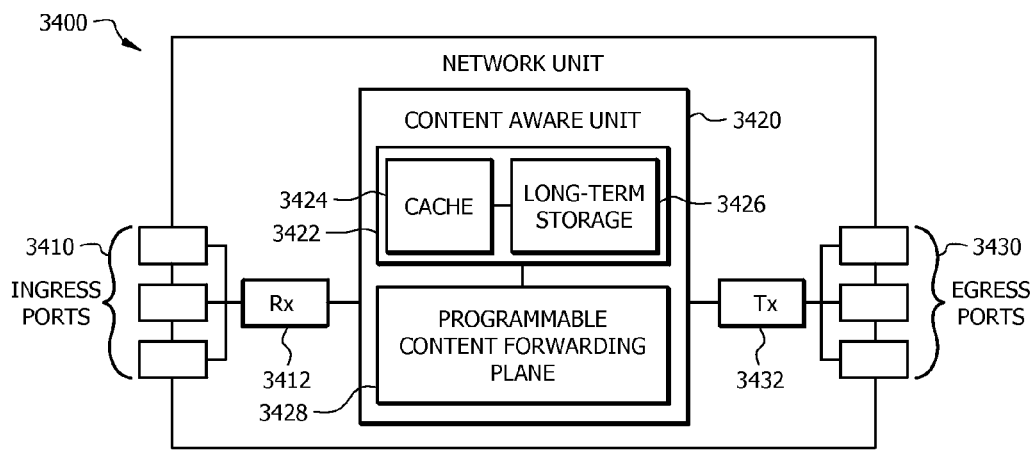
FIG. 34 is a schematic diagram of an embodiment of a transmitter/receiver unit.

FIG. 34 illustrates an embodiment of a network node 3400, which may be any device that transports and processes data through a network. For instance, the network node 3400 may be a content router or any node or router in the CCN schemes described above. The network node 3400 may be configured to implement or support the name-based neighbor discovery and multi-hop service discovery methods described above. The network node 3400 may comprise one or more ingress ports (also referred to as interfaces or faces) 3410 coupled to a receiver (Rx) 3412 for receiving signals and frames/data from other network components. The network node 3400 may comprise a content aware unit 3420 to determine which network components to send content to. The content aware unit 3420 may be implemented using hardware, software, or both. The network unit 3400 may also comprise one or more egress ports (also referred to as interfaces or faces) 3430 coupled to a transmitter (Tx) 3432 for transmitting signals and frames/data to the other network components. The receiver 3412, content aware unit 3420, and transmitter 3432 may also be configured to implement at least some of the disclosed methods, which may be based on hardware, software, or both. The components of the network node 3400 may be arranged as shown in FIG. 34.

The content aware unit 3420 may also comprise a programmable content forwarding plane block 3428 and one or more storage blocks 3422 that may be coupled to the programmable content forwarding plane block 3428. The programmable content forwarding plane block 3428 may be configured to implement content forwarding and processing functions, such as at an application layer or layer 3 (L3) in the Open Systems Interconnection (OSI) model, where the content may be forwarded based on content name or prefix and possibly other content related information that maps the content to network traffic. Such mapping information may be maintained in a content table at the content aware unit 3420 or the network unit 3400. The programmable content forwarding plane block 3428 may interpret user requests for content and accordingly fetch content, e.g., based on metadata and/or content name, from the network or other content routers and may store the content, e.g., temporarily, in the storage blocks 3422. The programmable content forwarding plane block 3428 may then forward the cached content to the user. The programmable content forwarding plane block 3428 may be implemented using software, hardware, or both and may operate above the IP layer or layer 2 (L2) in the OSi model. The storage blocks 3422 may comprise a cache 3424 for temporarily storing content, such as content that is requested by a subscriber. Additionally, the storage blocks 3422 may comprise a long-term storage 3426 for storing content relatively longer, such as content submitted by a publisher. For instance, the cache 3424 and the long-term storage 3426 may include Dynamic random-access memories (DRAMs), solid-state drives (SSDs), hard disks, or combinations thereof.

Figure 35:
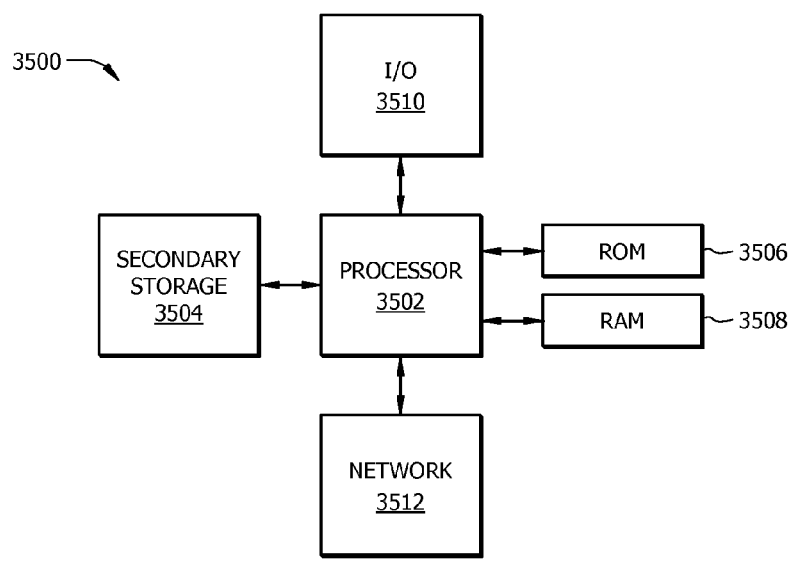
FIG. 35 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 35 illustrates a typical, general-purpose network component 3500 suitable for implementing one or more embodiments of the components disclosed herein. The network component 3500 includes a processor 3502 (which may be referred to as a central processor unit or CPU) that is in communication with memory devices including secondary storage 3504, read only memory (ROM) 3506, random access memory (RAM) 3508, input/output (I/O) devices 3510, and network connectivity devices 3512. The processor 3502 may be implemented as one or more CPU chips, or may be part of one or more application specific integrated circuits (ASICs).

The secondary storage 3504 is typically comprised of one or more disk drives or tape drives and is used for non-volatile storage of data and as an over-flow data storage device if RAM 3508 is not large enough to hold all working data. Secondary storage 3504 may be used to store programs that are loaded into RAM 3508 when such programs are selected for execution. The ROM 3506 is used to store instructions and perhaps data that are read during program execution. ROM 3506 is a non-volatile memory device that typically has a small memory capacity relative to the larger memory capacity of secondary storage 3504. The RAM 3508 is used to store volatile data and perhaps to store instructions. Access to both ROM 3506 and RAM 3508 is typically faster than to secondary storage 3504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A content router, comprising:
a plurality of interfaces coupled to a plurality of physical links to other nodes in an information centric network;
a receiver coupled to the plurality of interfaces and configured to receive messages;
a transmitter coupled to the plurality of interfaces and configured to transmit messages;
a memory device comprising a pending interest table (PIT) configured to store pending interest requests that have not been answered by corresponding data responses; and
a service publishing and discovery (SPD) module comprising a processor and coupled to the receiver, to the memory device, and to the transmitter, wherein the SPD module is configured to:
store status updates of the physical links;
determine a next hop node and a number of hops to forward a received service discovery interest message based on a prefix in a name-based service discovery protocol name of the received service discovery interest message; and
create an entry in the PIT to indicate a pending interest in a service discovery data message responsive to the received service discovery interest message,
wherein the transmitter is further configured to transmit a transmitted service discovery message to the next hop node based on the received service discovery message to search all services available within the number of hops along a path through the next hop node, and
wherein the receiver is further configured to receive a data message comprising aggregated service profiles comprising data indicating all services available within the number of hops along the path through the next hop node.

2. The content router of claim 1, wherein the transmitted service discovery interest message comprises a transmitted name-based service discovery protocol name that comprises a first term, a second term, and a third term, wherein the first term comprises a pre-defined service discovery interest message, the second term denotes a name prefix of a next destination hop node, and the third term denotes the name prefix of a current source hop node.

3. The content router of claim 2, wherein the SPD on the current source hop node is configured to create the transmitted service discovery interest message to unreached hop nodes, wherein the transmitted service discovery interest message comprises a new name prefix that does not include a previous hop to prevent a backward service discovery interest message with the name prefix being sent from the current source hop node.

4. The content router of claim 1, wherein the content router is configured to find a first available path from an origin node to an available service on a remote node by tracing faces of intermediate nodes from a collected and aggregated service profile.

5. The content router of claim 1, wherein the transmitted service discovery interest message comprises a transmitted name-based service discovery protocol name associated with a name-based service discovery protocol that employs a hop number attribute in the service discovery interest message to define the number of hops to be searched for all available services.

6. The content router of claim 5, wherein determining the number of hops to forward the received service discovery interest message comprises processing the received service discovery interest message to determine a current hop count and create the transmitted service discovery message for the next hop node by setting the hop number attribute to a value of one less than the current hop count.

7. The content router of claim 1, wherein the name-based service discovery protocol name is associated with a name-based service discovery protocol that employs a session nonce attribute in the received service discovery interest message to distinguish a certain set of service discovery interest messages issued from a certain origin node in a certain service discovery session with other interest messages issued from different origin nodes in different sessions.

8. The content router of claim 7, wherein the SPD is configured to avoid processing one of redundant and repeated service discovery interest messages based on the session nonce attribute.

9. The content router of claim 7, wherein the transmitter is configured to only respond to a the received service discovery interest message with the aggregated service profiles in a responsive data message and discard later arriving interest messages with the aggregated service profiles when the later arriving interest messages comprise a common session nonce.

10. A network node, comprising:
a plurality of interfaces configured to:
 transmit service discovery interest messages to next hop nodes to search all services available within a specified number of hops along a path through the next hop nodes in an information centric network; and
 receive one or more service discovery data messages comprising remote service profiles indicating all discoverable services available from a plurality of remote nodes within the specified number of hops in the information centric network;
a link manager (LM) comprising a processor coupled to the interfaces, wherein the LM is configured to monitor the interfaces; and
a local service publishing and discovery (SPD) module comprising a processor and coupled to the interfaces and to the LM, wherein the local SPD module is configured to:
 discover an available service on a reachable one of the remote nodes within the specified number of hops from the network node by:
  encoding the specified hop number into a hop number field in the service discovery interest messages;
  forwarding the service discovery interest messages to the next hop nodes via the interfaces;
  receiving the one or more service discovery data messages, via the interfaces, which are responsive to the service discovery interest messages, the service discovery data messages being received from the remote nodes, the service discovery data messages comprising the remote service profiles indicating all discoverable services available within the specified number of hops; and
  aggregating local service profiles published by local services on the network node with the remote service profiles from the remote nodes, wherein the local services publish only to the local SPD module; and
 configure and register the remote nodes with corresponding interfaces based on a prefix in a name-based service discovery protocol name of the remote service profiles, wherein the LM is configured to notify the local SPD module when a new link to one of the remote nodes is detected at one of the interfaces.

11. The network node of claim 10, wherein the network node further comprises a pending interest table (PIT); and wherein the local SPD module is further configured to:
 receive a received service discovery interest message from an origin node via a first of the interfaces, wherein the received service discovery interest message comprises a received hop number that is greater than zero;
 create the service discovery interest messages based on the received service discovery interest message by decrementing the received hop number by one to obtain the specified number of hops; and
 create an entry in the PIT indicating an interest in a result of the service discovery interest messages by the origin node via the first interface.

12. The network node of claim 10, wherein the local SPD module is further configured to:
 receive a second service discovery interest message from an origin node via a first of the interfaces, wherein the second service discovery interest message comprises a second hop number that is equal to zero; and
 in response to the second service discovery interest message, forward a second service discovery data message indicating local services toward the origin node via the first of the interfaces.

13. The network node of claim 11, wherein the received service discovery interest message comprises an origin node name.

14. The network node of claim 13, wherein the local SPD module is configured to refrain from forwarding the service discovery interest messages to the origin node.

15. A method for discovering services in an information centric network, comprising:
 receiving local service profiles of local services;
 formulating, with a processor in a local node, an interest message to a next hop node within the information centric network, wherein the interest message comprises a hop number and a request for service profiles for all discoverable services provided by all remote nodes within the hop number, wherein the hop number indicates a number of hops to forward the interest message;
 receiving a data message from the next hop node, wherein the data message comprises aggregated service profiles for all discoverable services provided by the next hop node and from other remote nodes coupled to the next hop node within the hop number of the local node; and
 aggregating with a processor the local service profiles of the local services and the aggregated service profiles received from the next hop node.

16. The method of claim 15, wherein the interest message comprises a first interest message, the next hop node comprises a first remote node, and wherein the method further comprises:
 receiving a second interest message from the first remote node, wherein the second interest message comprises a second request for service profiles and a second hop number, wherein the second hop number specifies a number of hops away from the first remote node to forward the second interest message;
 transmitting a third interest message to a second remote node wherein the third interest message comprises the second request for all discoverable service profiles and a third hop number, wherein the third hop number is equal to the second hop number decremented by one, and wherein the third hop number indicates a number of hops away from the local node to forward the third interest message.

17. The method of claim 16, wherein the data message comprises a first data message, and wherein the method further comprises:
   receiving a second data message from the second remote node, wherein the second data message comprises aggregated service profiles for all discoverable services provided by the second remote node and remote nodes within the second hop number from the first remote node;
   aggregating the service profiles within the second data message with the service profiles of services provided by the local node to produce new aggregated service profiles; and
   transmitting the new aggregated service profiles in a third data message to the first remote node.

18. The method of claim 15, wherein the interest message comprises a session nonce to differentiate the interest message from interest messages generated by other nodes.

* * * * *